(12) United States Patent
Urkowitz et al.

(10) Patent No.: US 8,044,846 B1
(45) Date of Patent: Oct. 25, 2011

(54) METHOD FOR DEBLURRING RADAR RANGE-DOPPLER IMAGES

(75) Inventors: Harry Urkowitz, Philadelphia, PA (US); Jeff D. Cammerata, Medford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 271 days.

(21) Appl. No.: 11/946,943

(22) Filed: Nov. 29, 2007

(51) Int. Cl.
G01S 13/89 (2006.01)
G01S 13/00 (2006.01)
G01S 13/90 (2006.01)

(52) U.S. Cl. ............... 342/179; 342/25 R; 342/25 A; 342/25 F; 342/104; 342/109; 342/118; 342/134; 342/135; 342/175; 342/176; 342/195

(58) Field of Classification Search ....... 342/25 R–25 F, 342/82–103, 104–115, 118, 127–145, 159 342/175, 176, 179, 189–197, 27, 28, 73
See application file for complete search history.

(56) References Cited

U.S. PATENT DOCUMENTS

| | | | |
|---|---|---|---|
| 3,995,270 A | 11/1976 | Perry et al. | |
| 5,151,702 A | 9/1992 | Urkowitz | |
| 5,157,403 A | 10/1992 | Urkowitz | |
| 5,173,706 A | 12/1992 | Urkowitz | |
| 5,309,161 A | 5/1994 | Urkowitz et al. | |
| 5,376,939 A | 12/1994 | Urkowitz | |
| 5,414,428 A | 5/1995 | Gallagher et al. | |
| 5,440,311 A | 8/1995 | Gallagher et al. | |
| 5,481,270 A | 1/1996 | Urkowitz et al. | |
| 5,734,347 A * | 3/1998 | McEligot | 342/159 |
| H1720 H * | 4/1998 | Chen | 342/25 E |
| 5,760,734 A | 6/1998 | Urkowitz | |
| 5,784,492 A * | 7/1998 | Cohen et al. | 342/25 F |
| 6,356,227 B1 * | 3/2002 | Gibson et al. | 342/25 D |
| 6,661,369 B1 * | 12/2003 | Cho | 342/25 R |
| 7,236,125 B2 * | 6/2007 | Tullsson | 342/159 |
| 7,245,250 B1 * | 7/2007 | Kalayeh | 342/25 R |
| 7,450,054 B2 * | 11/2008 | Sartor et al. | 342/25 F |
| 7,508,334 B2 * | 3/2009 | Allen et al. | 342/25 F |
| 7,538,712 B2 * | 5/2009 | Allen et al. | 342/25 R |
| 7,629,920 B1 | 12/2009 | Kuhl et al. | |
| 7,737,877 B2 * | 6/2010 | Sartor et al. | 342/25 F |
| 7,929,802 B2 * | 4/2011 | Rahmes et al. | 342/73 |
| 2003/0222807 A1 * | 12/2003 | Cho | 342/25 R |
| 2006/0066475 A1 * | 3/2006 | Tullsson | 342/159 |

FOREIGN PATENT DOCUMENTS

EP  1560038 A1 * 8/2005

(Continued)

OTHER PUBLICATIONS

S. Treitel et al, "The Design of High Resolution Digital Filters," IEEE Trans. Geoscience Electronics, vol. GE-4, No. 1, pp. 25-38 (Jun. 1966).

(Continued)

*Primary Examiner* — Bernarr E Gregory
(74) *Attorney, Agent, or Firm* — Howard IP Law Group, PC

(57) ABSTRACT

A method for displaying information relating to the range and Doppler of a remote target includes transmitting electromagnetic energy toward the target, and receiving reflected signals defining a two-dimensional (range-Doppler) radar image. The reflected signals are matched-filtered, which tends to blur the image. The image is deblurred while the features of thermal noise enhancement and irregularity of the deconvolved output are constrained to produce a single point deblurring output.

24 Claims, 20 Drawing Sheets

FOREIGN PATENT DOCUMENTS

| | | | | | |
|---|---|---|---|---|---|
| GB | 2239737 | A | * | 7/1991 | |
| JP | 60252289 | A | * | 12/1985 | 342/25 A |
| JP | 61050083 | A | * | 3/1986 | 342/25 A |

OTHER PUBLICATIONS

Bucci, "Doppler Tolerant Range Sidelobe Suppression for Pulse Compression Radars," MS Thesis, Dept. of Electrical and Computer Engineering, Drexel University, Philadelphia, PA (Jun. 1991). Also as Tech Rpt. MTMR-91-TR-001, GE Aerospace, Government Electronic Systems Division, Moorestown, NJ (Jun. 1991).

Urkowitz et al, "Doppler Tolerant Range Sidelobe Suppression for Meteorological Radar with Pulse Compression," Proc. Int'l. Geoscience and Remote Sensing Symp., Houston, TX, vol. I, pp. 206-208 (May 26-29, 1992).

Bucci et al, "Use of Pulse Compression and Range Sidelobe Suppression for Meteorological Radar Measurements at S-and X-band," Proc. Int'l. Conf. on Advanced Radar Meterology, COST 75, Brussels, Belgium (Sep. 1994).

Urkowitz, "'Don't Care' Values in Range Sidelobe Suppression," Aegis Programs Tech. Memo, AP-Z-ADV-T0-2001, Lockheed Martin NE&SS, Moorestown, NJ, Sections 15.0, 17.0 (Nov. 29, 2002).

Urkowitz, "Gradients of Hermitian and Other Complex Forms with Application to Least Squares, Minimum Norm Solutions, and Deconvolution," Tech Report, MTMR-95-TR-001, Lockheed Martin Government Electronic Systems, Moorestown, NJ (Apr. 15, 1995).

Nahman et al, "Deconvolution of Time Domain Waveforms in the Presence of Noise," Tech. Note 1047, National Bureau of Standards, Boulder, CO (Oct. 1981).

Nahman, "Software Correction of Measured Pulse Data", pp. 351-417, Fast Electrical and Optical Measurements, vol. 1, J.I. Thompson and L.M. Luessen, eds., NATO Advanced Study Inst. Series E: Applied Sciences No. 108, Dordrect and Boston: Martinus Nyhoff Publishers, 1986.

* cited by examiner

|   | n | | |
|---|---|---|---|
|   | 0 | 1 | 2 |
| m 0 | 1 | -2 | 1 |
| m 1 | -2 | 4 | -2 |
| m 2 | 1 | -2 | 1 |

FIG. 9

|   | n | | |
|---|---|---|---|
| m | 0 | 1 | 2 |
| 0 | 1 | 0 | 0 |
| 1 | 0 | -2 | 0 |
| 2 | 0 | 0 | 1 |

FIG. 11

METHOD FOR DEBLURRING RADAR RANGE-DOPPLER IMAGES

This invention was made with Government support under contract number N00024-03-C-6110 awarded by the Department of the Navy. The Government has certain rights in this invention.

FIELD OF THE INVENTION

The present invention relates to radar range-Doppler images, and, more specifically, to a method for coherent deblurring of radar range-Doppler images.

BACKGROUND

The present invention relates to radar range-Doppler imaging. Time resolution of radar signals (which corresponds to range resolution) requires large signal bandwidth while fine Doppler resolution (which corresponds to range or "closing" rate or speed) requires long signal duration. This combination can be achieved in radar systems by continuously changing or "sweeping" the frequency of the transmitted electromagnetic signal. Such frequency sweeps may be linear with time (change frequency at a constant rate) or they may be nonlinear. One possible way to accomplish frequency sweeping is to transmit the electromagnetic radar signal in the form of signal pulse train in which the pulses vary in frequency from pulse to pulse over an interval that is the reciprocal of the desired time resolution and over a time interval that is the reciprocal of the desired frequency resolution. Time resolution of signals, such as, for example, radar signals, requires large signal bandwidth and fine Doppler resolution of such signals requires long signal duration. Attempts to achieve a combination of fine time resolution and fine Doppler resolution typically use pulse trains in which pulses vary in frequency from pulse to pulse over a frequency interval that is the reciprocal of the desired time (i.e. range) resolution and over a time interval that are the reciprocal of the desired frequency Doppler resolution. With rotating objects, however, there are spreads in Doppler values that must be evaluated and that impose certain limits on pulse train duration.

A radar target object may be stationary, but contain portions which rotate. This will be true, for example, for a stationary helicopter having rotating blades. Such rotating blades will include portions which are advancing toward the radar while other portions recede from the radar. For rotating objects, Doppler spreads of signals must be continually evaluated to provide clear radar images and, as a result, limitations are required on pulse train duration in order to return satisfactory images. It should be noted that an actual physical image may not be displayed, but the resulting quantity may be described in terms of its range and range rate (i.e. Doppler) properties.

Radar signals are always accompanied by undesired noise. In order to reduce or ameliorate the effects of such noise, the processing of radar signals reflected from a target uses a filter matched to the amplitude-time distribution of the transmitted pulses, which enhances the desired reflections from the target relative to the unwanted noise. Such matched filtering is described, for example, in U.S. Pat. No. 5,151,702 issued Sep. 29, 1992 in the name of Urkowitz. The result of the amplitude-time matched filtering is a range-Doppler map or "image". Due to the matched filtering operation, a point object having constant radial velocity (termed "closing" speed or velocity regardless of whether the target approaches or recedes) will be represented by signals exhibiting a spread in range and Doppler value. This phenomenon is called "blurring" and results from the use of the matched filter. Thus, a body having several different motions will have a "blurred" radar echo in which the targets and motions are not well resolved. The blurring introduces an uncertainty into the determination of the location and speed of the target.

Improved or alternative radar image deblurring is desired.

SUMMARY OF THE INVENTION

A method according to an aspect of the invention is for deblurring a two-dimensional radar image. The method comprises the step of generating a return electromagnetic signal from one or more moving targets. A one-dimensional radar range-amplitude image is generated by matched linear filtering, where the matched linear filtering maximizes the peak amplitude of the combined set of pixels of the one-dimensional image. The filtering undesirably spreads the filtered pixels of the radar image in the range dimension to thereby produce a point spread function. The method further comprises the step of coherently deblurring the radar image and its point spread functions by filtering with coefficients derived from a least-squares approximation of the blurred image to a desired image to thereby produce a deblurred image.

A method according to an aspect of the invention for deblurring a radar image. The method comprises the step of generating a return electromagnetic signal from one or more moving targets. A two-dimensional radar range-Doppler image is generated by matched linear filtering, where the matched linear filtering maximizes the peak amplitude of the combined set of pixels of the two-dimensional image. The filtering undesirably spreads the filtered pixels of the radar image in both range and Doppler frequency dimensions to thereby produce a point spread function. The method further comprises the step of coherently deblurring the radar image and its point spread functions by filtering with coefficients derived from a least-squares approximation of the blurred image to a desired image to thereby produce a deblurred image. In a preferred mode of this method, the least-squares criterion minimizes the difference (in both dimensions) between the two-dimensional image and the desired two-dimensional image.

BRIEF DESCRIPTION OF THE DRAWINGS

FIG. 9 is a matrix showing the values of the two-dimensional second backward difference operator $\Delta^2(n,m)$ where the arguments are separable $\Delta^2(n,m)=\Delta^2(n)\Delta^2(m)$.

FIG. 11 is a matrix illustrating values where the arguments of the two-dimensional backward difference operator are not separable, and FIG. 12 plots the values of FIG. 11 in graphical form;

DETAILED DESCRIPTION

Figure 1:
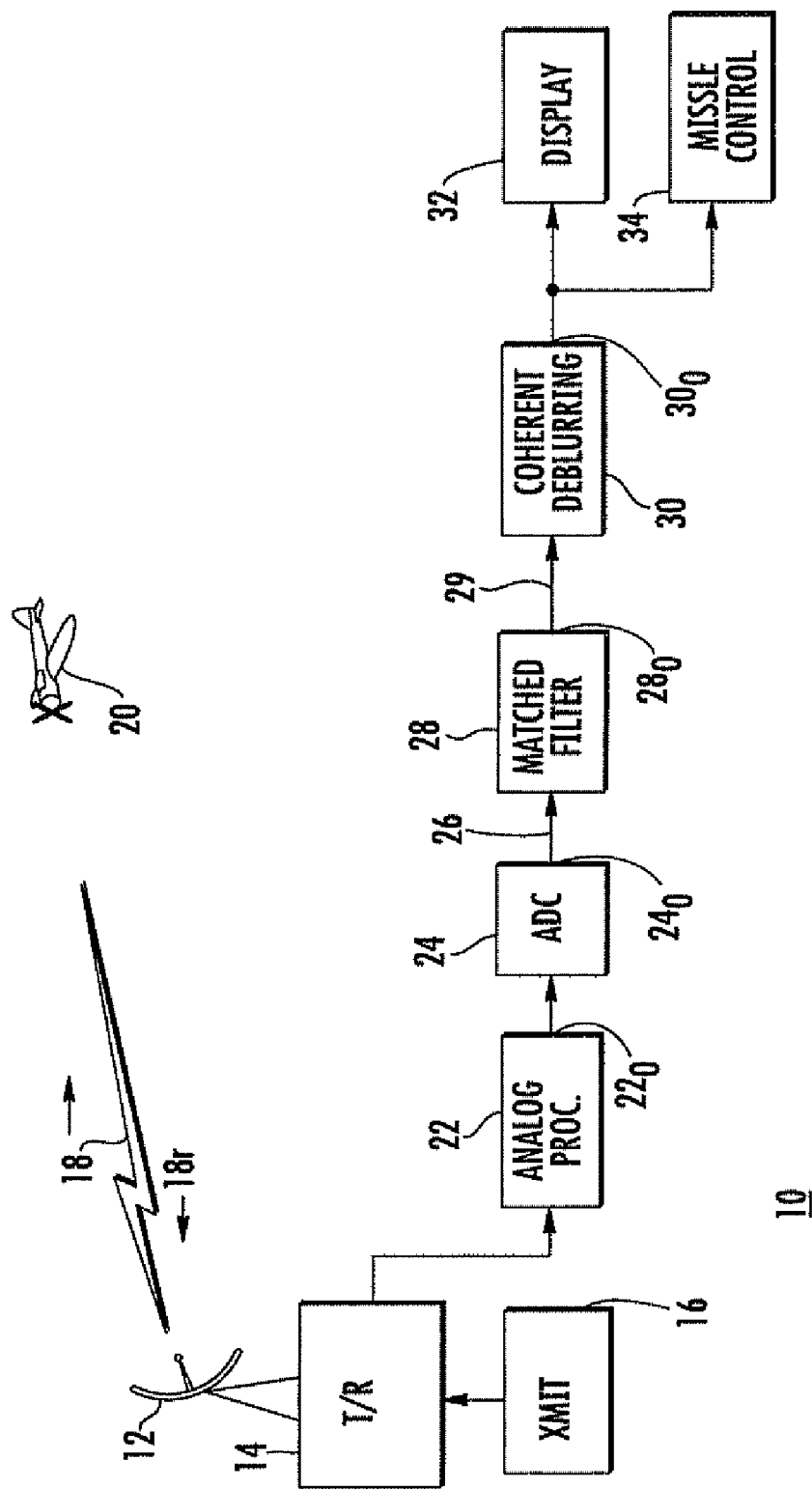
FIG. 1 is a simplified block diagram illustrating a radar system according to an aspect of the invention.

FIG. 1 is a simplified block diagram of a radar system 10 according to an aspect of the invention. In FIG. 1, radar system 10 includes an antenna 12 and transmit-receive (T/R) device 14. T/R device 14 receives signals to be transmitted from a transmitter (XMIT) 16, and couples the signals to be transmitted to antenna 12, which transmits the signals in the form of electromagnetic radiation, illustrated by a "lightning bolt" symbol 18. The electromagnetic radiation propagates outward, and impinges on a target, if present. An airborne target 20 is illustrated. The transmitted electromagnetic energy impinges on target 20, and a portion of the signal incident on the target is reflected back toward the radar antenna 12, as suggested by arrow 18*r*. The reflected electromagnetic signal is transduced by antenna 12, and coupled through the T/R device 14 to analog signal processing, illustrated by block 22. The analog signal processing may include low-noise amplification, and down conversion to intermediate frequency (IF) or baseband. The processed analog signals are coupled from an output port 22*o* of analog processing block 22 to an analog-to-digital converter (ADC) illustrated as a block 24. The complex digital signals representing the reflected electromagnetic energy, including its amplitude and phase components, are coupled from an output port 24*0* of ADC 24 by way of a path 26 to a matched filter or pulse compressor illustrated as a block 28.

Figure 3:
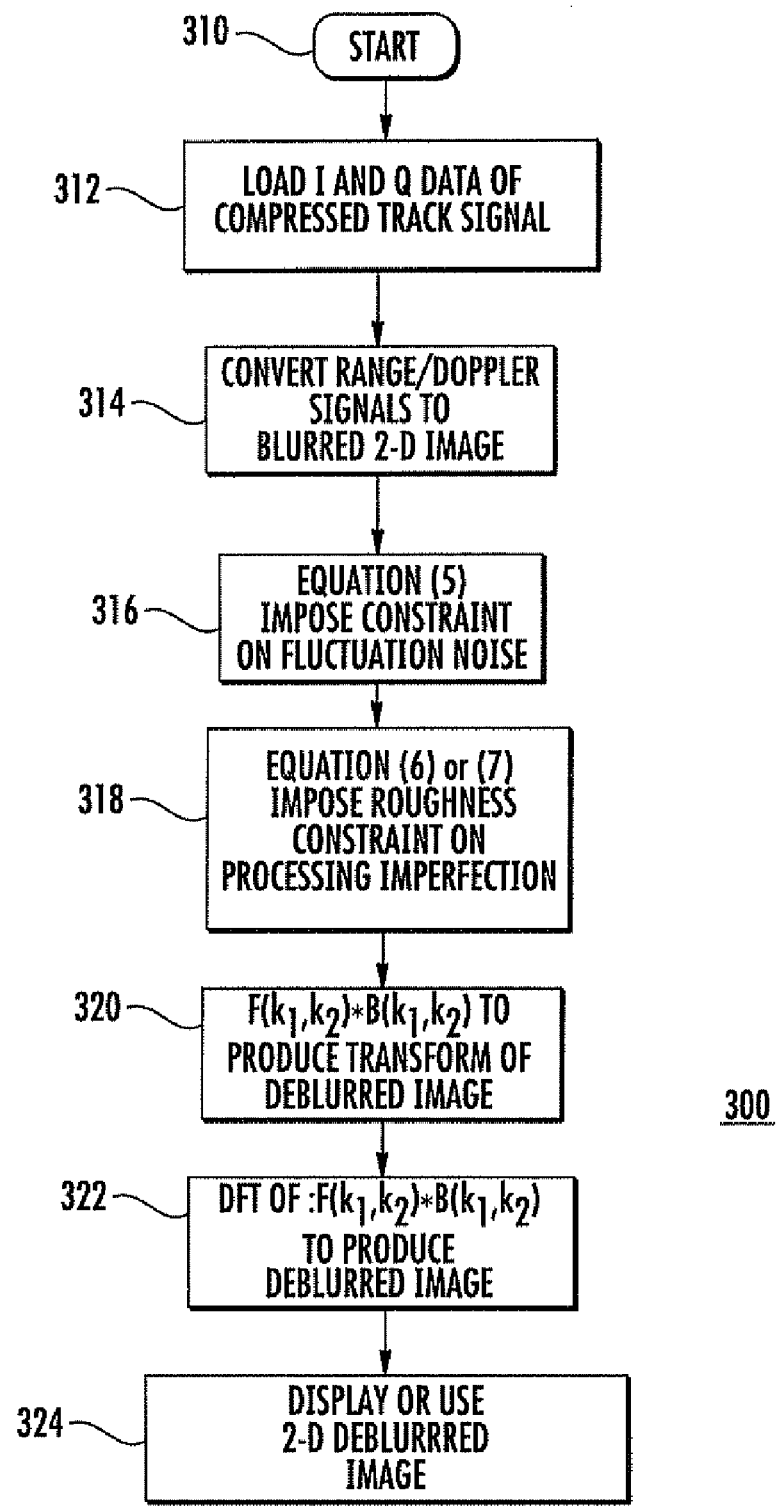
FIG. 3 is a simplified logic flow chart or diagram illustrating the processing for performing two-dimensional image deblurring in a radar system.
Figure 4:
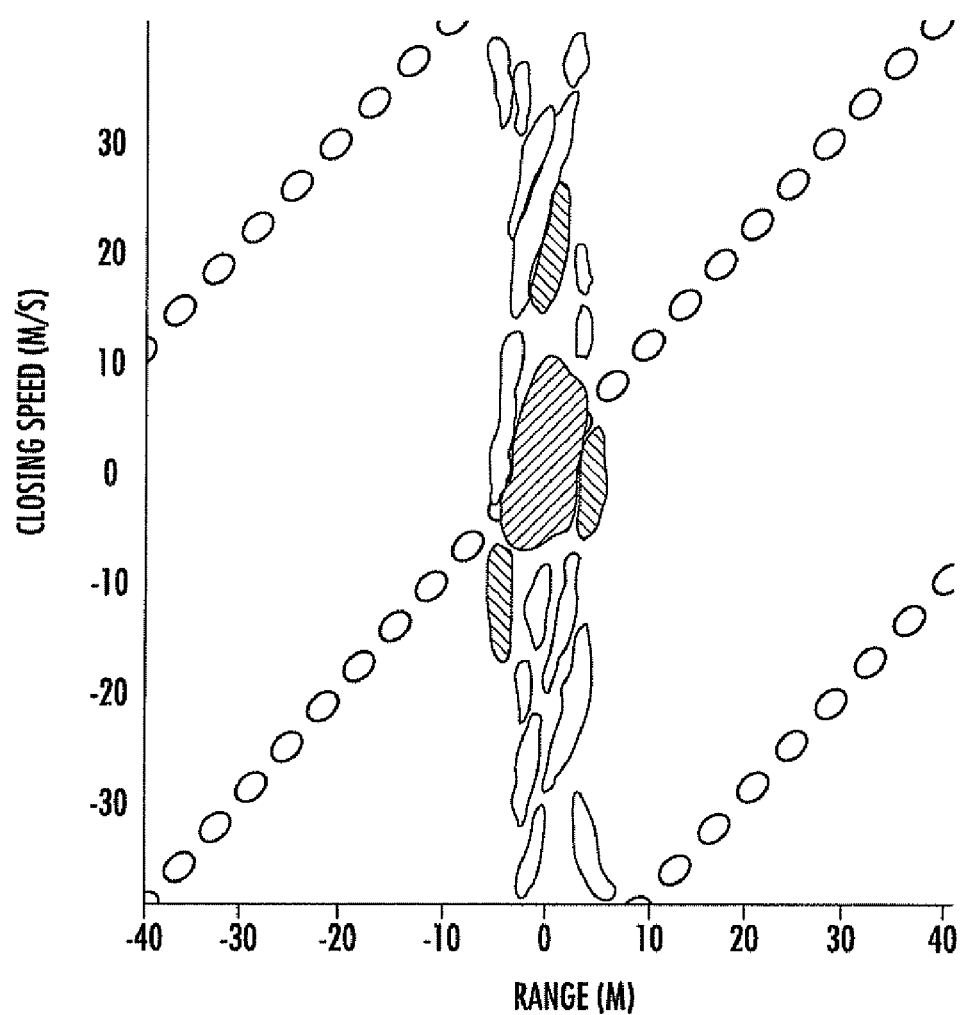
FIG. 4 is a simplified plot illustrating conversion of range and Doppler signals into a blurred two-dimensional image, and more specifically the stationary point function response to the frequency jump waveform of FIG. 13.

Matched filter 28 of FIG. 1 operates on the complex envelope of the echo signal. Matched filter 28 of FIG. 1 operates pulse by pulse on the complex envelope of the echo signal. Matched filter 28 is matched to the amplitude and phase time or range distribution of each pulse of the received echo. The signal appearing at the output port 28*o* of matched filter 28 and on path 29 of FIG. 1 may be viewed as a compressed, one dimensional, "image" in range. The range compressed pulse images, as a sequence, are operated upon pulse to pulse by Doppler filtering to produce a two-dimensional image yielding the range-Doppler (two-dimensional) image, as indicated in block 320 and 322 of FIG. 3. The one dimensional (range compressed) image is simply a time line indicating the time location (range) of the targets. The two dimensional image resulting from Doppler filtering of the sequence of range compressed echoes is the output of block 322 of FIG. 3. This output is displayed in block 324. Thus, the two dimensional image is a plot of range versus closing speed, as illustrated in FIG. 4. In FIG. 4 the portion of the two-dimensional image outside the central portion is several orders of magnitude lower than the central portion. The two-dimensional image is a plot of range versus closing speed, as illustrated in FIG. 4. In either case, the image will be made up of arrays of small elements, which are termed "pixels" for lack of a better term.

The matched filtering provided by block 28 enhances the target-representative signal relative to the noise. Matched filtering by its nature results in partial responses of the filter even when a nonmatching signal is applied. These partial responses "overlap" between each pixel and its adjacent and semi-adjacent pixels. These overlapped partial responses distort or "blur" the desired image which appears at output port 28*o*.

According to an aspect of the invention, the blurred two-dimensional image resulting from matched filtering by block 28 of FIG. 1 is ameliorated or deblurred by coherent deblurring, illustrated by a block 30 of FIG. 1. The deblurred image produced at output port 30*o* of block 30 is made available for display as represented by a block 32, and or is made available to a radar-controlled device such as an interceptor missile control system, illustrated as a block 34.

Thus, range-Doppler images produced with long linearly swept pulse waveforms exhibit substantial range-Doppler image blurring after pulse compression and Doppler filtering. Linear deconvolution is used to de-blur or sharpen the images. The linear deconvolution uses a least-squares criterion based upon a desired point spread function. The deconvolution is applied in two dimensions. The resulting range-Doppler image is a finely resolved image of small pixel extent in both dimensions. In order to ameliorate the tendency of deconvolution to exaggerate perturbations, two forms of constraint are applied to the deconvolution. The first form of constraint is limitation of the growth of noise in the result or output. The second form of constraint is on the "roughness" or fluctuation in the output. Algorithms for constrained deconvolution in one dimension and in two dimensions are possible, but aspects of the invention relate only to two-dimensional images.

Pulse compression such as that performed by block 28 of FIG. 1 results in time (range) "sidelobes" that can cause clutter "flooding" as well as interference from closely spaced objects. Sidelobe suppression can be viewed as a result of deconvolution since the same criterion, namely the least squares criterion, when applied results in suppression of clutter flooding and closely spaced object returns.

Deblurring of an image involves deconvolution. Conventional technologies exist for deblurring of images. These conventional techniques operate upon intensities (amplitudes) in which all phase information has been lost. That is, they are non-coherent deblurring or deconvolution schemes. In the case of radar echoes, for example, the present invention operates on the complex envelope in which all the phase information is preserved. This permits so-called "coherent" deblurring. The signal processing operations are linear, so the result of operating on one point is extendable to many points or scatterers of a body. Therefore, the coherent processing deblurs the spread in range and Doppler caused by a single point scatterer. The present invention deblurs the "point spread function" produced by the matched linear filtering of the complex envelope. Coherent deblurring of the point spread function produces a single "pixel" value, i.e. output for one range-Doppler value. Because of the linearity of the operation, deblurring will be accomplished for all scattering points on the object.

The input sequence b(n, q) is the blurred result of the transmitted waveform interacting with the matched-filtered echo or reflected waveform produced by block 28 of FIG. 1. The deblurring filtering performed by block 30 is described by its two-dimensional impulse response or two-dimensional transfer function. The two-dimensional transfer function interacts with the pulse-compressed echo from block 28 to produce a deblurred result. The deblurring processing according to an aspect of the invention includes determining the deblurring filter two-dimensional impulse response characteristics f(n,q) or the two-dimensional frequency transfer function $F(k_1,k_2)=DFT[f(n,q)]$, to thereby produce an output sequence.

The transmitted waveform may consist of a linearly frequency modulated pulse. More generally, the transmitted waveform may consist of a pulse frequency modulated with time. The invention also applies to a pulse consisting of plural subpulses, each of which is at a different frequency than adjacent pulses, or in which the frequency differences vary linearly with time. Such a pulse train may be termed "step (or jump)—frequency modulated". The echoes produced by such waveforms must be matched-filtered in block 28 of FIG. 1 in order to maximize the signal-to-noise ratio of the received information. The matched filtering of such waveforms reflected from a point target produces a response which is spread in both time and in Doppler frequency. This spread makes it difficult to discern the position and speed of the target. Deblurring filter 30 ameliorates the blurring to more effectively identify the range and Doppler shift.

The coherent deblurring process performed in block 30 of FIG. 1, when applied to one-dimensional images, uses coefficients $$F(k) = \frac{D(k)}{B(k)}, \text{ where} \tag{1}$$

D(k)≡DFT d(n), k=0, 1, . . . , N+M−1;
F(k)≡DFT f(n), k=0, 1, . . . , N+M−1;
B(k)≡DFT b(n), k=0, 1, . . . , N+M−1,
where:
D is the Discrete Fourier Transform of the desired deblurred image;
F is the transform required to produce D, given blurred input waveform B,
as further described below.

The desired deblurring as described by F of Equation (1) cannot actually be accomplished because of physical limitations, which is to say that the deblurring is impossible in the stated form. These physical limitations manifest themselves in exaggeration of small imperfections arising from the apparatus or processing, as well as the exaggeration of accompanying fluctuation noise, including thermal fluctuation noise.

According to an aspect of the invention, the characteristics of a perfect or theoretical deconvolving or deblurring filter F are modified to constrain the deleterious effects of the imperfections, which makes it possible to make the necessary compromises in actual practice. The compromises take the imperfections into account so that they are minimized according to a minimization criterion. This criterion is selected to be the least-squares error criterion. The application of the least-squares criterion leads to a linear processing operation.

Figure 2:
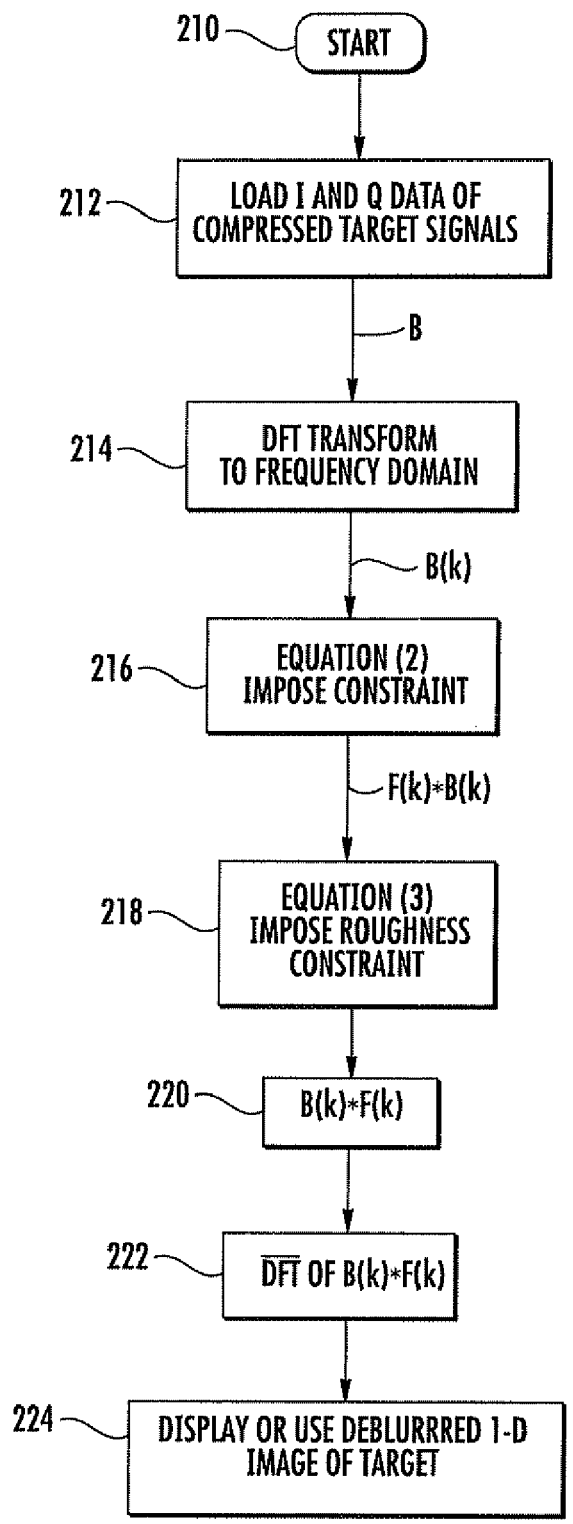
FIG. 2 is a simplified logic flow chart or diagram illustrating the processing for performing one-dimensional image deblurring in a radar system.

The processing performed in deblurring block 30 for one-dimensional deblurring is illustrated in the logic flow 200 of FIG. 2. In FIG. 2, the logic flow starts at a Start block 210, and flows to a block 212. Block 212 represents loading into memory the complex I and Q data representing the compressed target signals so that they can be further processed. From block 212, the logic flows to a block 214, which represents the application of a Discrete Fourier Transform (DFT) to the I and Q data, to transform the information into the frequency domain, to thereby produce the transform B(k) of the blurred input waveform B. Block 216 represents using B(k) in a process described by $$F(k) = \frac{B^*(k) \cdot D(k)}{|B(k)|^2 + \gamma_1}, k = 0, 1, \ldots, N+M-2 \tag{2}$$

where:
B* is the complex conjugate of B;
D is the transform of the ideal desired image; and
$\gamma_1$ is the constraint that accounts for fluctuation noise,
to produce F(k) times B(k), where B(k) is the deblurred image. This step of the processing imposes a constraint which partially compensates for the ill-posed nature of the deblurring process Block 218 of FIG. 2 represents the application of a further constraint. This constraint is termed a "roughness" constraint, and accounts for imperfections in the processing, such as the imperfections attributable to amplitude quantization. The additional constraint consists of modifying equation (2) to include an additional factor in the denominator, so that the equation becomes $$F(k) = \frac{B^*(k) \cdot D(k)}{|B(k)|^2 \left[1 + 16\gamma_2 \sin^4\left(\frac{\pi k}{N+M-1}\right)\right] + \gamma_1}, \tag{3}$$

$$k = 0, 1, \ldots, N+M-2$$

In equation 3, N is the length of the blurred sequence entering the deblurring filter, M is the number of coefficients that comprise the deblurring filter, and $\gamma_2$ is a coefficient which adjusts or compromises the results of the desired deblurred result and the imperfections in the processing. F(k) is the DFT to the frequency domain of the point spread function.

The logic 200 of FIG. 2 flows from block 218 to a block 220, which represents the multiplication of the one-dimensional blurred image B(k) by F(k)

$$F(k) \cdot B(k) = DFT[b(n)*f(n)], k=0,1,\ldots N+M-1 \tag{4}$$

Equation (4) is the transform of the deblurred one-dimensional image. In order to obtain the time representation of the one-dimensional image, the inverse DFT is taken of F(k)B(k), as suggested by block 222 of FIG. 2. Block 1024 represents the use or display of the resulting deblurred one-dimensional (range/amplitude) image. The use of the image may include the control of interceptor missiles and the like.

According to an aspect of the invention, the two-dimensional radar image information of range and Doppler can also be deblurred. The logic flow 300 of FIG. 3 represents the processing. In FIG. 3, the logic begins at a START block 310, and flows to a block 312, which represents loading of loading into memory the complex I and Q data representing the compressed target signals. From block 312, the logic flows to a block 314, which conceptually represents the conversion of the range and Doppler signals into a blurred two-dimensional image, illustrated as FIG. 4. It should be noted that a single point or pixel in the plane of the image represents a single value of range and a single value of Doppler. In general, the blurred two-dimensional image will not be used per se.

Figure 5A:
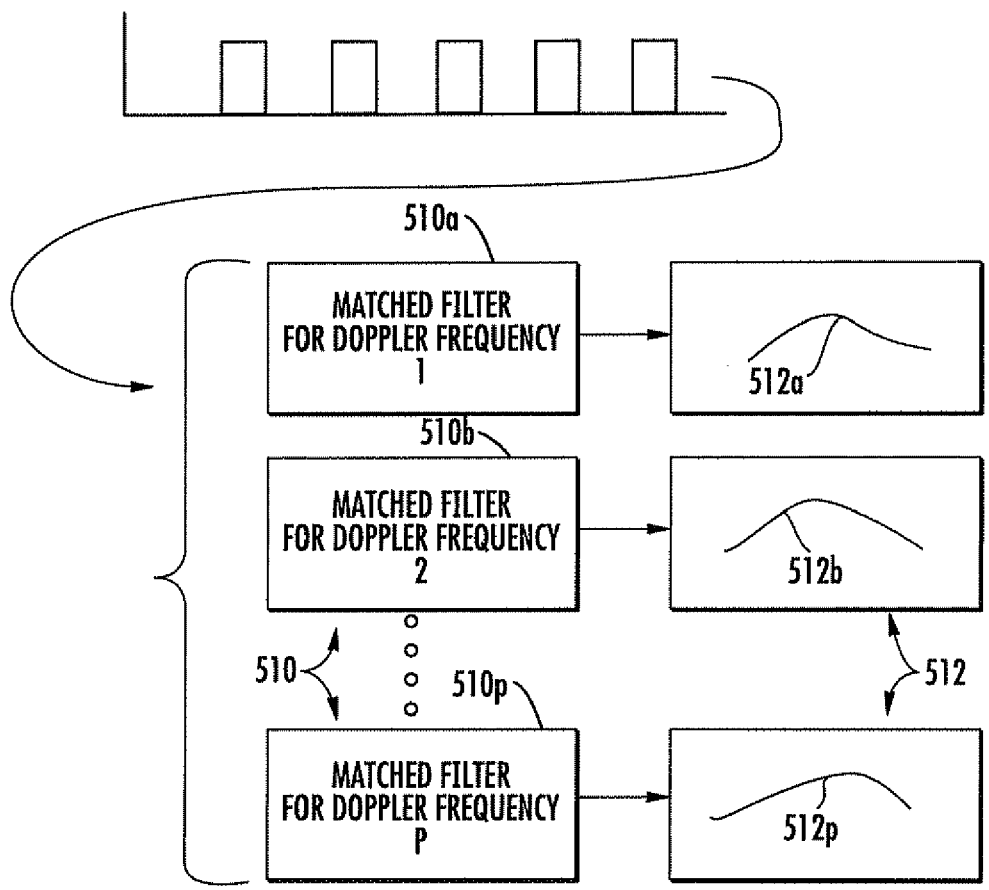
FIG. 5A is a notional representation of an apparatus showing how the plot of FIG. 4 arises, and FIG. 5B aids in understanding the generation of the blurred image arises.
Figure 5B:
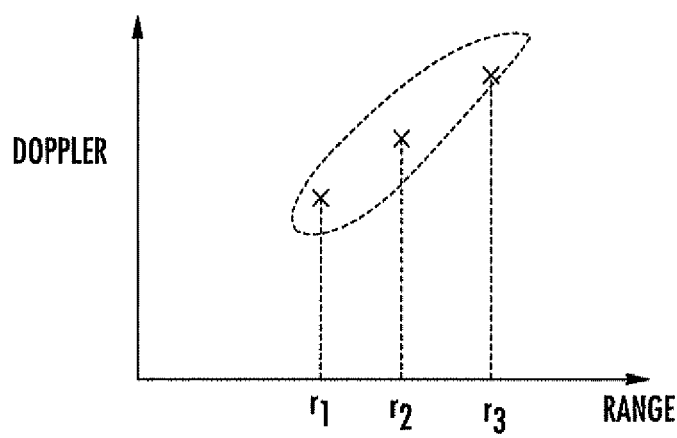

The blurred image of FIG. 4 can be viewed as being generated as described in conjunction with FIG. 5A. FIG. 5A illustrates signals from a radar pulse or pulse train applied to a set 510 of matched filters, one for each Doppler frequency of the return or echo signal. More particularly, the matched filters of set 410 include matched filters 510a, 510b, ..., 510P, where P is the number of cognizable Doppler frequencies. At the output of each matched filter, the response will be an amplitude-time plot, as suggested by the representations of blocks 512a, 512b, ..., 512P of a set 512. The output of each matched filter, as exemplified by the amplitude-time plots of blocks of set 512, can be plotted in terms of range and Doppler frequency. It will be understood that each Doppler is represented by a quantized "bin" and the ranges are also quantized, but they may be viewed as being continuous analog functions. FIG. 5B is a notional plot of the Doppler responses plotted against range.

The next step in deblurring the two-dimensional image is to constrain the two-dimensional fluctuation noise in a manner similar to that of equation (2)

$$F(k_1, k_2) = \frac{B^*(k_1, k_2) \cdot D(k_1, k_2)}{|B(k_1, k_2)|^2 + \gamma_3} \quad (5)$$

where:

B is the two-dimensional DFT of the blurred two-dimensional image;

D is the two-dimensional DFT of the desired deblurred image;

F is the two-dimensional DFT of the deblurring filtering performed in block 30 of FIG. 1; and $\gamma_3$ acts as a constraint on the imperfections attributable to noise, as described for the one-dimensional image processing.

From block 316 of FIG. 3, the logic flows to a block 318. This step of the processing imposes a constraint which partially compensates for the ill-posed nature of the deblurring process. This constraint is termed a "roughness" constraint, and accounts for imperfections in the processing, such as the imperfections attributable to amplitude quantization. The additional constraint consists of modifying equation (5) to include an additional quantity in the denominator, so that the equation becomes $$F(k_1, k_2) = \frac{B^*(k_1, k_2) \cdot D(k_1, k_2)}{\left|B(k_1, k_2)^2 \cdot \left[1 + y_4 \sin^2\left(\frac{\pi k 1}{W}\right)^* \sin^2(\pi k_2/W)\right] + \gamma_3\right|} \quad (6)$$

where:

$\gamma_4$ is a roughness constraint applied to imperfections in processing;

W represents the length of the sequence in the image, which essentially means the extent of the image in each dimension.

Equation (6) represents the process imposed on $B(k_1,k_2)$ by $F(k_1,k_2)$. Equation (6) is for the case in which the roughness constraints are separable, or alternatively $$F(k_1, k_2) = \frac{B^* \cdot (k_1, k_2) \cdot D(k_1, k_2)}{|B(k_1, k_2)|^2 \cdot \left[1 + y_4 \sin^2\left(\frac{\pi(k_1 + k_2)}{W}\right)\right] + \gamma_3} \quad (7)$$

in the case that the roughness constraints are not separable.

From block 318 of FIG. 3, the logic flows to a block 320, representing the product of F(k1,k2) with B(k1,k2), which is the DFT of the deblurred image. The inverse DFT of the product B(k1, k2) F(k1,k2), represented by block 322, is the deblurred image available for display and or other use (block 324).

An analytic derivation of the various equations associated with the invention follows.

This analysis deals with radar range-Doppler imaging. As an introduction, time resolution requires larger bandwidth and fine Doppler resolution requires long duration. The combination is usually achieved by a pulse train where the pulses vary in frequency from pulse to pulse over a frequency interval that is the reciprocal of the desired time (i.e. range) resolution and over a time interval that is the reciprocal of the desired frequency resolution. Of course, with rotating objects, there are Doppler spreads that must be accounted for and that impose certain limits on pulse train duration.

In addition to these factors, the processing of such a waveform includes matched filtering and the result is a range-Doppler map or "image." Of course, an actual physical image may not be displayed, but it is useful to discuss the resulting quantity in terms of its range and range rate (i.e. Doppler) properties. Because of the matched filtering operation, a point object having constant radial velocity will be displayed as a spread in range and Doppler. This is the inevitable "blurring" that occurs with the use of the required matched filtering. Thus, a body having several scattering centers with different motions will have a "blurred" radar echo in which the scatterers and motions cannot be resolved. In order to extract the separate scatterers and their Dopplers, the electronic "image" must be deblurred.

Considered as an image, deblurring really means deconvolution and that is what this analysis relates to. From the point of view of image deblurring or deconvolution, t many schemes already exist for deblurring of images, but these schemes operate upon intensities in which all phase information has been lost. That is, they are non-coherent deblurring or deconvolution schemes. In the case of radar echoes, we are able to operate on the complex envelope in which all the phase information is preserved. This permits so-called "coherent" deblurring and that is the specific subject of this analysis. The operations are linear in the signal processing and so the result upon operating on one point is extendable to many points or scatterers of a body. Therefore, the coherent processing that we want to form is the one that deblurs the spread in range and Doppler caused by a single point scatterer. That is, we deblur the "point spread function" produced by the matched linear filtering of the complex envelope. Coherent deblurring of the point spread function produces a single "pixel" value, i.e. output for one value or range-Doppler value. Because of the linearity or the operation, deblurring will be accomplished for all scattering points on the object.

This deblurring is subject to several limitations. Because the waveform is of limited bandwidth and duration, we clearly cannot extend the deblurring to essentially unlimited bandwidth and duration. Any attempt to do so will result in noise enhancement and exaggeration of any perturbations. Thus, constraints on the process must be applied. One obvious constraint is on the noise that may be exaggerated in the deblurring process. Another constraint is one on "roughness" of the output. This is explained below, but it has to do with the fact that deblurring is a bandwidth enhancing process and small perturbations tend to increase and so a constraint is applied.

Pulse compression in radar results in time sidelobes that can be annoying and also can cause clutter "flooding" as well as interference from closely spaced objects. There is ah extensive literature concerned with range sidelobe suppression. Among the references are S. Treitel and E. A. Robinson, "The Design of High Resolution Digital Filters", IEEE Trans. Geoscience Electronics, Vol. GE-4, pp. 25-38, June 1966; and H. Urkowitz and N. J. Bucci, "Doppler Tolerant Range Sidelobe Suppression in Pulse Compression Meteorological Radar", Proc. Int'l Geoscience and Remote Sensing Symp., Houston, Tex. May 26-29, 1992, Vol. 1, pp. 206-208. Sidelobe suppression can be viewed as an application of deconvolution since the same criterion, the least-squares criterion, can be applied to both problems. One of the objectives of this analysis is to include constraints such as receiver thermal noise. An outline for including noise was given by Treitel and Robinson, but their application was only to real signals. In the present memorandum, their approach is extended to complex envelopes.

The least squares criterion, and its equivalents, is likely the oldest approach for measuring similarity. Its history goes back at least to Gauss and Legendre. Its popularity stems both from its success and its advantageous analytic properties. In this analysis, we show the application to both deconvolution and range sidelobe suppression after pulse compression. In fact these two problems may be viewed as being the same, as is argued below. In all such problems, an error criterion is established, and a suitable norm is established for the error. If we let $\bar{e}$ denote the error, then the least squares criterion seeks the condition that minimizes the squared norm $$\|\bar{e}\|^2 \tag{8}$$

In the problems treated here, error will be represented by an error vector $\bar{e}$. Also, there is established a desirable result, represented by a vector $\bar{d}$, and an available observation or result of a process, represented by the vector $\bar{z}$. Given such a vector, we operate upon this vector with a linear transformation represented by the matrix $\underline{B}$ to form $$\underline{B}\bar{z}. \tag{9}$$

The difference $\bar{e}$ between $\bar{d}$ and $\underline{B}\bar{z}$, where this difference has an appropriate measure, is to be minimized. The least squares criterion is:

Minimize the Squared Norm:

$$\|\bar{e}\|^2 = \|\bar{d} - \underline{B}\bar{z}\|^2 \tag{10}$$

This criterion in this form is appropriate both for sidelobe suppression and deconvolution, as described below.

Figure 6:
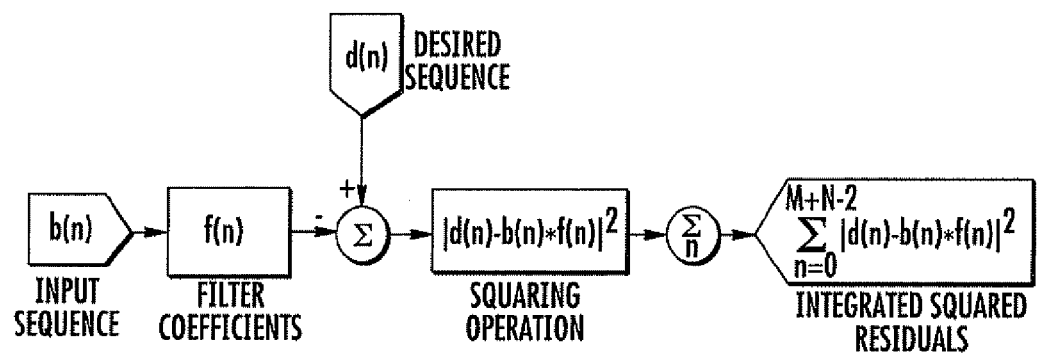
FIG. 6 illustrates an aspect of the deconvolution process of the sequence b(n) with the filter f(n), and the minimization of the integrated squared residuals by the least-squares criterion as described in the analysis.

The deconvolution process is illustrated in FIG. 6. The squared norm of the error sequence, e(n) in Equation (11), is the "integrated squared residuals" of FIG. 6. This is in recognition of the fact that the residuals show up as small departures from zero over the duration of the output, which is of length N+M−1.

When expressed as a discrete time convolution, we may write $$\|\underline{e}\|^2 = \sum_{n=0}^{M+N-2} |d(n) - b(n)^* f(n)|^2 = \sum_{n=0}^{M+N-2} |e(n)|^2 \tag{11}$$

where:
b(n)≡input sequence to be deconvolved, n=0,1, . . . , N−1
f(n)≡deconvolving filter coefficients, n−0,1, . . . , M−1
d(n)≡desired output sequence, n=0,1, . . . , N+M−2
e(n)≡error sequence, n=0,1, . . . , N+M−2
The convolution noted in Equation (11) may be expanded:

$$b(n)^* f(n) = \sum_{s=0}^{M-1} f(s) \cdot b(n-s), \quad n = 0, 1, \ldots, N+M-1 \tag{12}$$

One may note that if a sequence of length N is convolved with an impulse response of length M, the resulting sequence will have length N+M−1.

It is appropriate to ask for the source of the input sequence. The input sequence b(n) is the result of matched filtering (pulse compression) the radar reflection from a point target. The transmitted waveform generally will have a large duration—bandwidth product—i.e. a dispersed waveform. A popular form of such a waveform is the frequency jump burst (FJB).

The analysis continues with a discussion of constraints and filter length. The term "Filter Length" refers to the length M of the deconvolving filter f(n). In general, large M means a smaller least squares error, but there is clearly a limit on the length of the deconvolving filter. We must trade off M versus error. For full deconvolution, we have $$d(n) = \begin{cases} 1, & n = n_o \\ 0, & \text{otherwise} \end{cases} \tag{13}$$

The value of $n_o$ is ordinarily taken as near the center of the output sequence:

$$n_o = \frac{N+M-2}{2} \tag{14}$$

However, this may place a severe requirement on the deconvolution, so it may be desired to specify a "shape" having dimensions of range and Doppler for the output. The particular "shape" or "form" is open to question. One possible approach is to allow a few data points near the desired output to "float" and to say that we "don't care" what those values are. The "don't care" criterion is particularly applicable to the desire to suppress "sidelobes" that accompany the input sequence b(n). Of course there may be a small degradation in the sequence resolution and the designer has to trade off resolution coarsening versus the sidelobe reduction. Sequence sidelobes may be considered as a form of roughness and so that constraint also acts to restrain the sidelobes. As for specifying a particular shape, the Gaussian shape is a popular one because it is smooth and its width is specified by a single parameter. In continuous form, the shape is given by $$\exp\left(\frac{-t^2}{2\sigma^2}\right) \qquad (15)$$

In sampled form centered at n=n$_o$ this would be expressed as $$d(n) = \exp\left(\frac{-(n-n_o)^2}{2\sigma^2}\right), |n-n_o| \le n_{max} \qquad (16)$$

The parameter σ expresses the "width" of the desired response and is under the control of the designer. Larger values of σ correspond to broader shapes. Equation (16) expresses the fact that the desired sequence must be finite in duration. In addition must be large enough to make the desired sequence be sufficiently close to zero to prevent significant sidelobe creation.

A solution can be achieved by use of the Discrete Fourier Transform (DFT). Parseval's theorem can be applied in the discrete frequency domain. Use the following definitions $$D(k) \equiv \text{DFT} d(n), k=0,1,\ldots,N+M-1$$

$$F(k) \equiv \text{DFT} f(n), k=0,1,\ldots,N+M-1$$

$$B(k) \equiv \text{DFT} b(n), k=0,1,\ldots,N+M-1 \qquad (17)$$

These are to be applied to Equation (11). First, we note that the convolution of Equation (12) will give $$\text{DFT}[b(n)*f(n)] = B(k) F(k).$$

where we note that the aperture for n is (0,N+M−1), the length of the convolution. Thus, the total error may be written as $$\text{Error}_{Total} = \sum_{k=0}^{M+N-2} |D(k) - B(k) \cdot F(k)|^2 \qquad (18)$$

Equation (18) tells us that the error can be made to vanish by setting $$F(k) = \frac{D(k)}{B(k)} \qquad (1)$$

There are several limitations that must be imposed on the "solution" of Equation (1). The required deconvolving filter f(n) has been assigned to have N nonzero values; F(k), its DFT, was expanded to N+M−1 elements by zero padding. The solution obtained from Equation (1) must be limited to N values. Also, the fact that Equation (1) is the finite in extent means that a perfect solution is not generally obtainable. Furthermore, without constraints, the solution tends to be unstable. The reason is that B(k), for large values of k, generally falls off. So the division in Equation (1) will exaggerate these higher k values. This is interpreted as exaggerating the high frequency components which, in turn, exaggerate any instability and enhance noise outputs. Therefore, some constraints must be applied.

Noise constraints are evaluated next. An obvious constraint is that imposed by system noise, usually modeled as a stationary multivariate Gaussian process, although only its power density spectrum is needed for the least squares criterion. The addition of a noise constraint is treated below. A useful result of the analysis is that Equation (17) becomes modified to $$F(k) = \frac{B*(k) \cdot D(k)}{|B(k)|^2 + \gamma_1}, k=0,1,\ldots,N+M-2 \qquad (2)$$

where $\gamma_1$ is real and positive. This, of course, reduces to Equation (1) for $\gamma_1=0$.

The value of $\gamma_1$ is determined by the relative amount of noise compared with the time sidelobes that appear in the deconvolution process. It is argued below that a proper value for $\gamma_1$ is one that yields equal values for the noise variance and for the "mean square" error. This mean square error is $\|e\|^2$ divided by the duration of the error sequence. Thus, the total mean square error is $$\frac{\|e\|^2}{N+M-1} + \gamma_1 \cdot var \text{ [noise]} = \text{total [mean square error]} \qquad (19)$$

There seems to be no reason for making the noise contribution larger than mean square error arising from imperfect deconvolution, so it is appropriate to set $$\gamma_1 = 1 \qquad (20)$$

The "roughness" constraints can be evaluated. Equation (1) shows how the DFT of F(k) can raise serious problems of stability where B(k) is small. In particular, where B(k) is small, its reciprocal may rise sharply with consequent enhancement of any small perturbation in the b(n). Thus, there is a tendency to produce jaggedness in the deconvolved output. A limited word length in the binary representations of the quantities aggravates the situation. It would be advantageous to have a way to temper that roughness by introducing a "roughness" constraint as was done by N. S. Nahman and M. E. Guillaume, "Deconvolution of time domain waveforms in the presence of noise", Tech. Note 1047, National Bureau of Standards, Boulder, Colo., October 1981; and N. S. Nahman, "Software Correction of Measured Pulse Data", pp. 351-417, *Fast Electrical and Optical Measurements*, Volume 1, J. I. Thompson and L. M. Luessen, eds., NATO Advanced Study Inst. Series E: Applied Sciences No. 108, Dordrect and Boston: Martinus Nyhoff Publishers, 1986. The roughness constraint is treated below. The result is that F(k) is given by, without noise, $$F(k) = \frac{B*(k) \cdot D(k)}{|B(k)|^2 \cdot \left[1 + 16\gamma_2 \sin^4\left(\frac{\pi k}{(N+M-2)}\right)\right]} \qquad (3)$$

The constant $\gamma_2$ depends upon a judgment as to the balance between resulting "smoothness" and accuracy of deconvolution.

With this addition, Equation (2) becomes $$F(k) = \frac{B*(k) \cdot D(k)}{|B(k)|^2 \cdot \left[1 + 16\gamma_2 \sin^4\left(\frac{\pi k}{(N+M-1)}\right)\right] + \gamma_1} \qquad (21)$$

Equation (21) shows that the "roughness" or the output increases as the input increases. The balance between roughness and noise is not easy to state. The values of $\gamma_1$ and $\gamma_2$ will depend upon the particular circumstances.

Two-dimensional deconvolution is examined next. The two-dimensional (2-D) counterpart of the deconvolution problem is the extraction of the 2-D function that has been "blurred" be unwanted filtering. The use of the words "blur" and "deblurring" arise from optics applications. In many applications of deblurring techniques, already-formed images are the inputs. Such images are intensity images in which all phase information has been lost. We may term such deconvolution procedures as "intensity" or "noncoherent" deblurring. In contrast we deal here with "coherent" deblurring, consisting of linear operations upon complex envelopes of radar signals to produce range-Doppler images. Such coherent deblurring is the radar counterpart of optical deblurring using lenses, before intensities are extracted.

Figure 7:
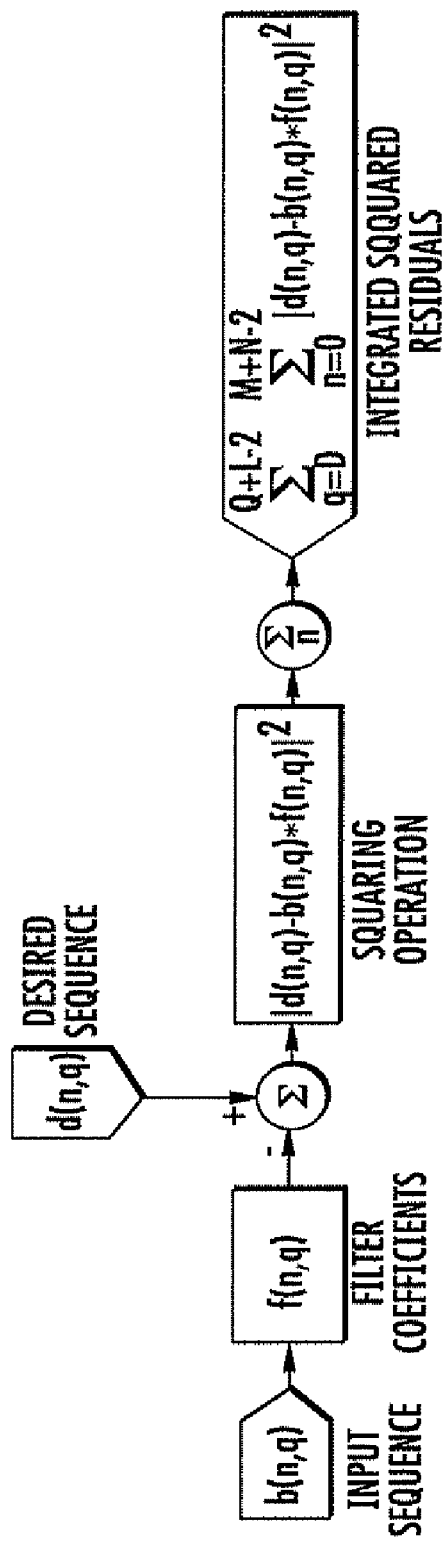
FIG. 7 illustrates two-dimensional filtering for deblurring, as described in the analysis.

In one dimension it has been possible, and practical, to perform deconvolution using matrix methods. Such methods involve matrix inversion, using matrix pseudo-inverses and other well-known methods. In the 2-D case, tensors are involved and their inversion is not straightforward, nor well known. Instead, we take refuge in 2-D Discrete Fourier Transforms. The deconvolution in 2-D turns out to be a division of DFT's. The 2-D case is illustrated in FIG. 7. The terminology is as follows:

b(n,q)≡blurred 2-D function, n=0, 1, . . . , N−1; q=0, 1, . . . , Q−1 f(n,q)≡2-D deblurring or deconvolving function, n=0, 1, . . . , M−1; q=0, 1, . . . , L−1.

d(n,q)≡2-D desired or deblurred function, n=0, 1, . . . , M+N−2; q=0, 1 . . . , Q+L−2.

The result of the deblurring process is the 2-D convolution $$b(n,q)*f(n,q)=c(n,q) \tag{22}$$

We want d(n,q) to be "close" to the result of Equation (22) and we measure the error by the squared norm of the difference, so we write, as in Equation (10)

$$\|e\|^2 = \|d(n,q) - b(n,q)*f(n,q)\|^2 \tag{23}$$

$$\|e\|^2 = \sum_{q=0}^{Q+L-2} \sum_{n=0}^{M+N-2} |d(n,q) - b(n,q)*f(n,q)|^2$$

Expanding the right side, $$\|e\| = \sum_{q=0}^{Q+L-2} \sum_{n=0}^{M+N-2} \left| d(n,q) - \sum_{r=0}^{M-1} \sum_{p=0}^{L-1} b(n-r, q-p) \cdot f(r,p) \right|^2 \tag{24}$$

All of the extra elements in the outer summations are necessary because a convolution produces elements beyond those of the constituent sequences. This, of course, will require zero padding if transforms are to be used and we turn to the use of DFT.

As described in conjunction with Equation (13), the question of the form of d(n,q) arises. "Don't care" values in n and q may be used, but we feel that, as before, a 2-D Gaussian shape is appropriate. To this end, we set $$d(n,q) = \exp\left[\frac{(n-n_0)^2}{2\sigma_1^2} + \frac{(q-q_0)^2}{2\sigma_1^2}\right], |n-n_0| \le n_{max}; |q-q_0| \le q_{max} \tag{25}$$

The "widths" in the two dimensions are controlled by the parameters $\sigma_1$ and $\sigma_2$. It may be convenient to make $\sigma_1=\sigma_2$, but this is not a necessity.

DFT 2-D deconvolution is addressed next. The two dimensional transforms are $$B(k_1, k_2) = DFT[b(n,q)] \tag{26}$$

$$B(k_1, k_2) = \sum_{n=0}^{M+N-2} \sum_{q=0}^{Q+L-2} b(n,q) \cdot \exp\left[-\frac{j2\pi nk_1}{M+N-1}\right] \cdot \exp\left[-\frac{j2\pi qk_2}{Q+L-1}\right]$$

We Make the Following Definitions:

$$D(k_1,k_2)=DFT[d(n,q)] \tag{27}$$

$$F(k_1,k_2)=DFT[f(n,q)] \tag{28}$$

It will be desirable to make the indices $k_1$ and $k_2$ to have the same length by appropriate zero padding of the sequences involved. By using Parseval's theorem for two dimensions, equation (24) may be written in the following form $$\|e\| = \sum_{q=0}^{Q+L-2} \sum_{n=0}^{M+N-2} |D(k_1,k_2) - B(k_1,k_2) \cdot F(k_1,k_2)|^2 \tag{29}$$

Without constraints, the minimization of Equation (29) is the 2-D counterpart of Equation (1):

$$F(k_1, k_2) = \frac{D(k_1, k_2)}{B(k_1, k_2)} \tag{30}$$

The limitations imposed on the above "solution" are similar to those on the 1-D "solution" of Equation (1).

Noise constraints are now discussed. With the presumption that the noise accompanying the input sequence b(n,q) of FIG. 7 has a flat power density spectrum, we may write, by analogy with Equation (2)

$$F(k_1, k_2) = \frac{B*(k_1, k_2) \cdot D(k_1, k_2)}{|B(k_1, k_2)|^2 + \gamma_3} \tag{5}$$

Again, the noise constraint in Equation (5) presumes that the noise power density spectrum is flat at the input to the deconvolving filter.

It is clear from Equation (29) that the 2-D deconvolving filter b(n,q) must be of sufficient length to accommodate the necessary deconvolving process. References to FIG. 7 and to the remarks leading to Equation (23) indicate that sufficient zero padding must be used to set all sequences to the proper length for processing. It may also be convenient to make the two dimensions of equal size:

$$M+N=Q+L \tag{31}$$

The "roughness" constraint in two dimensions is a natural extension of the one dimensional roughness constraint described in conjunction with Equation (3). The two-dimensional roughness constraint is treated below. As described below, the two-dimensional roughness constraint takes two forms, depending upon whether or not the 2-D constraint is separable into the product of 1-D constraints, when expressed as a 2-D DFT. The roughness constraint is expressed as follows: For separable arguments:

$$G(k_1, k_2) = G(k_1) \cdot G(k_2) = 16\sin^2\left(\frac{\pi k_1}{W}\right) \cdot \sin^2\left(\frac{\pi k_2}{W}\right) \quad (32)$$

where;

$$W = M+N-1 = Q+L-1 \quad (33)$$

For non-separable arguments $$G(k_1, k_2) = 4\sin^2\left(\frac{\pi(k_1, k_2)}{W}\right) \quad (34)$$

These constraints, when applied to the problem and combined with noise constraint as in Equation (5) result in two forms for the deconvolving filter. For the separable form of the roughness constraint, $$F(k_1, k_2) = \frac{B*(k_1, k_2) \cdot D(k_1, k_2)}{|B(k_1, k_2)|^2 \cdot \left[1 + \gamma_4 \sin^2\left(\frac{\pi k_1}{W}\right) \cdot \sin^2\left(\frac{\pi k_2}{W}\right)\right] + \gamma_3} \quad (6)$$

The constants associated with $G(k_1,k_2)$ have been absorbed into $\gamma_4$. For the non-separable form of the roughness constraint, $$F(k_1, k_2) = \frac{B*(k_1, k_2) \cdot D(k_1, k_2)}{|B(k_1, k_2)|^2 \cdot \left[1 + \gamma_4 \sin^2\left(\frac{\pi(k_1, k_2)}{W}\right)\right] + \gamma_3} \quad (7)$$

The Discrete Fourier Transform may be viewed as being a special case of the z-transform applied to finite duration sequences. One property of the z-transform not shared by the DFT is the fact that the z-transform applies to sequences of any length and is not periodic in its argument. Thus, there is no problem of aliasing or foldover. In many circumstances the use of the z-transform alleviates some difficulties so it seems appropriate to express the deconvolution in those terms. We use the following notation (See Equation (17)):

B(z)=z-transform of b(n)
D(z)=z-transform of d(n)
F(z)=z-transform of f(n)
$Z_A(z)$=one dimensional z-transform of the second backward difference operator (described below)
There are corresponding 2-dimensional z-transforms as follows:
$B(z_1,z_2)$
$D(z_1,z_2)$
$F(z_1,z_2)$
$Z_A(Z_1,Z_2)$
In terms of z-transforms, the DFT's transform as follows
B(k)→B(z)
B*(k)→B(1/z)
D(k)→D(z)
$D(k_1,k_2)$→$D(z_1,z_2)$
F(k)→F(z)

With these definitions the expressions of Equation (21) for the one dimensional case and Equation (6) for the two dimensional case become:
For one dimension:

$$F(z) = \frac{B(1/z) \cdot D(z)}{B(z) \cdot B(1/z) \cdot \left[1 + \gamma_2\left(\frac{(z-1)^2}{z^2}\right)\right] + \gamma_1} \quad (35)$$

For two dimensions:

$$F(z_1, z_2) = \frac{B(1/z_1, 1/z_2) \cdot D(z_1, z_2)}{B(z_1, z_2) \cdot B(1/z_1, 1/z_2) \cdot \left[1 + \gamma_2\left(\frac{(z_1 z_2 - 1)^2}{z_1^2 z_2^2}\right)\right] + \gamma_1} \quad (36)$$

The constants $\gamma_1$ and $\gamma_2$ have to be determined by the desired balance between noise and roughness.

To recapitulate, "Blurring" arises in radar range-Doppler imaging from the filtering needed to produce a range-Doppler map of a target's range and range rate. Given a target whose range and range rate form nearly a single value in the range-Doppler plane, the result of processing a waveform by matched filtering is a "spread" in the resulting range-Doppler image. The spread comes about from two basic causes:
 1. Limited bandwidth
 2. Limited waveform duration To get the combination of fine range resolution and fine Doppler resolution, the waveform is extended both in frequency and in time. To "compare" the received waveform in range, a "pulse compression" filter is used. The pulse compression filter is "matched" to the transmitted waveform and the result is a "compressed" waveform whose substantive duration is the reciprocal of the bandwidth. An analogous effect occurs in the Doppler processing. The result even for a small object having a fixed range rate gives a spread in the range and Doppler dimensions. This is called the "point spread function" or "point response function". Resolution enhancing techniques use an "inverse" filter to remove the spread. Unfortunately, the result is very unstable unless constraints are imposed on the output of the inversion.

In this analysis, both one-dimensional (range) deblurring and two dimensional (range and Doppler) deblurring are considered with constraints on:
 1. The thermal noise enhancement.
 2. The irregularity or "roughness" of the deconvolved or "deblurred" output.

The criterion of deblurring is that of a least squares fit to a desired deconvolved output. Ideally, the deblurring output, in response to a single value of range-Doppler combination, should be a single point (i.e. pixel) in the range-Doppler image plane. Instead, a realizable "pseudo point" image is taken as the ideal "point" to be sought. This is given in the form of a two-dimensional Gaussian function of small extent, representing the deblurred ultimate image. It is of such extent in the two dimensions that it is considered as the ideal "point" in the range-Doppler plane. This analysis considers deblurring in one dimension (range) and in two dimensions (range and Doppler). The range deblurring algorithm (i.e., one dimension) can be expressed in both time (i.e., sequence deconvolution) and frequency terms (i.e., in DFT). In frequency terms, the deconvolution is essentially a frequency inversion. To control the inherent instability associated with frequency inversion, two constraints were applied:
1. A constraint on noise growth
2. A constraint on the "roughness" or irregularity of the result arising from exaggeration of small perturbations.

Figure 14:
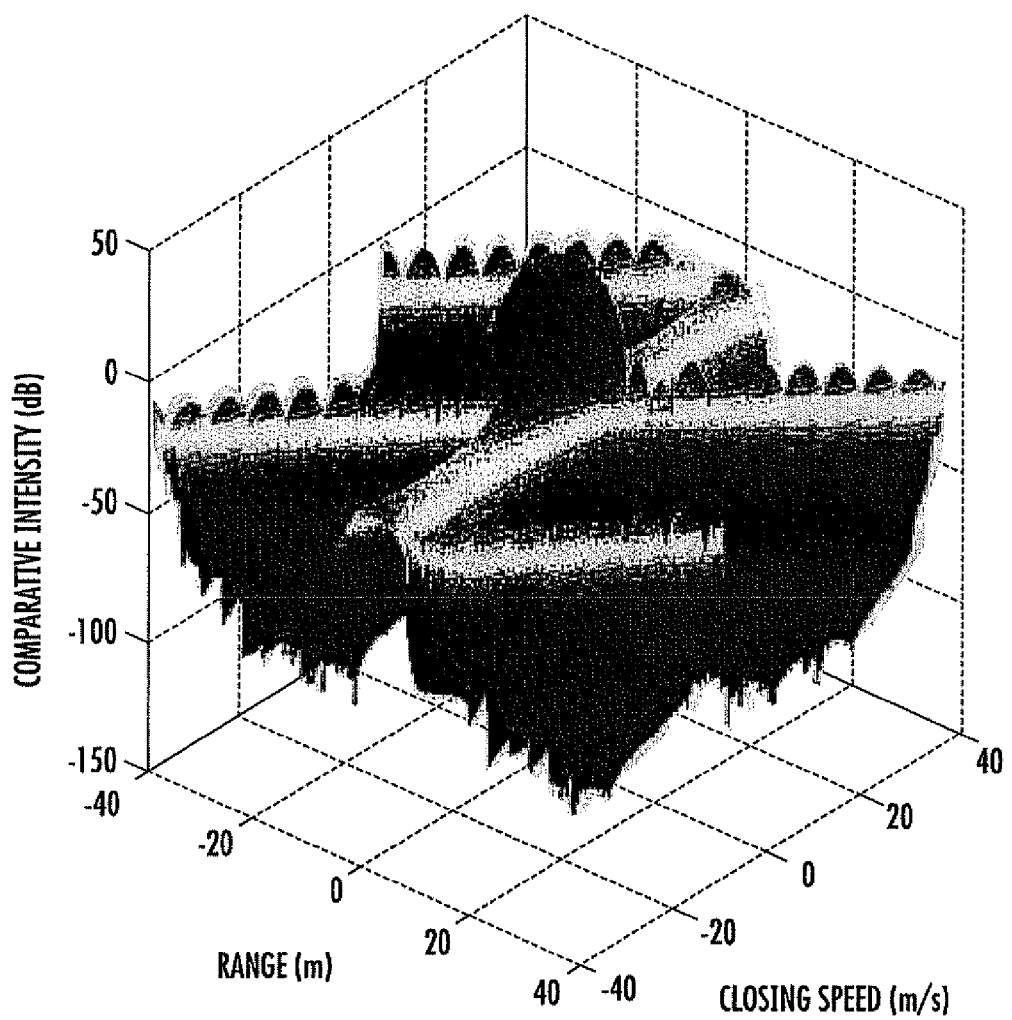
FIG. 14 is an isometric view of the point spread function of FIG. 4.
Figure 15:
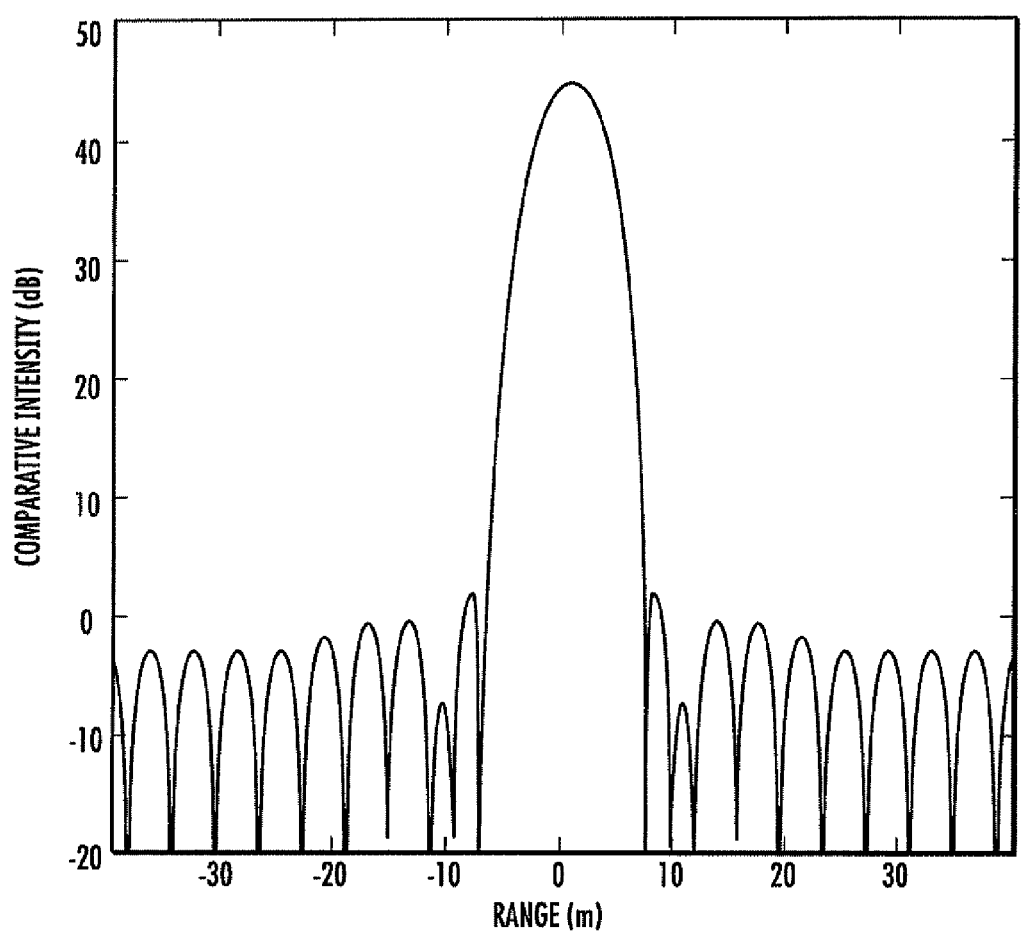
FIG. 15 is a range cut through the point spread function of FIG. 4.

The algorithm was applied to a particular example of a 2-D deblurring. The results are shown in conjunction with FIGS. 4, 13, 14, 15, 16, 17, 18, 19, and 20. Starting with the distorted range-Doppler image of FIG. 3, the algorithm removed essentially all of the distortion to produce the deconvolved image (FIGS. 15 and 18). The result is very nearly a single prominent pixel. The range and Doppler extents have each been reduced by a factor of approximately five to one.

The noise constraint is further evaluated. There is more than one criterion by which a noise constraint can be applied to least squares deconvolution. Generally, one wishes to "balance" error due to noise and whatever error or interference is caused by the environment. The deconvolution process based upon least squares as shown by Equation (11) minimizes the entire output of the deconvolving filter, except for the (presumably small) interval containing the desired output. Any residual from the convolution $b(n)*f(n)$ can be considered as "time" sidelobes. If the interference is due primarily from thermal noise it is appropriate to consider the mean square or variance of the noise which will be the same at every instant of time. If we wish to "balance" noise with the sidelobe interference, we need to express the mean square level of the difference, $$d(n)-b(n)*f(n) \quad (36)$$

This is given by $$\text{Mean square sidelobes} = \frac{1}{N+M-1} \sum_{n=0}^{M+N-2} |d(n) - b(n) * f(n)|^2 \quad (37)$$

The total mean square error is then given by the sum of the mean square sidelobes and a multiple of the noise variance, where the multiple, say $\gamma_1$, gives the relative corruption of sidelobe noise. These considerations lead to Equation (19). In the discussion relating to Equation (19) it was stated that it is appropriate to make the noise variance have the same value as the mean square value of the sidelobes, so the value of the relative amounts of interference is made to be the same, resulting in the value $$\gamma_1=1.$$

While it is plausible to balance the noise variance with the residual deconvolution error, one must not conclude that the noise going into the deconvolution filter $f(n)$ (See FIG. 6) has a flat power density spectrum, that is, that the elements of the sequence $b(n)$ are uncorrected. The sequence $b(n)$ may be the result of pulse compression rather than having come directly from the IF filter. The noise variance must be computed from the knowledge of the noise power density spectrum of the noise input to the deconvolving filter. While the noise power density spectrum is calculable at the input to the deconvolving filter, it is not calculable at the output of that filter until that filter is known. To take that into account raises some analytical complication that is not worthwhile to follow. It is preferable to subsume the value of the noise variance into the value of the constant $\gamma_1$ in Equation (19) and to determine its proper value empirically, based on simulation of the deconvolution process.

The roughness constraint is now evaluated. The process of deconvolution involves the equivalent of division by a frequency function. In particular, the denominator of a deconvolving filter frequency function contains the transform of the sequence to be deconvolved. In general this transform is limited and tends to "fall off" at high frequency. As a consequence, its reciprocal will increase at these high frequency. Therefore, small rapid variations tend to be enhanced increasing the "roughness" of the deconvolved output. In dealing with a function of continuous time, a measure of its roughness is its second derivative. In discrete time, the corresponding operator is the second backward difference operator. In evaluating the roughness constraint, it is desirable to consider the Second Backward Difference Operator. In discrete time, this operator is given by $$\Delta^2(n) = \begin{cases} +1, n=0 \\ -2, n=1 \\ +1, n=2 \\ 0, \text{otherwise} \end{cases} \quad (38)$$

Figure 8:
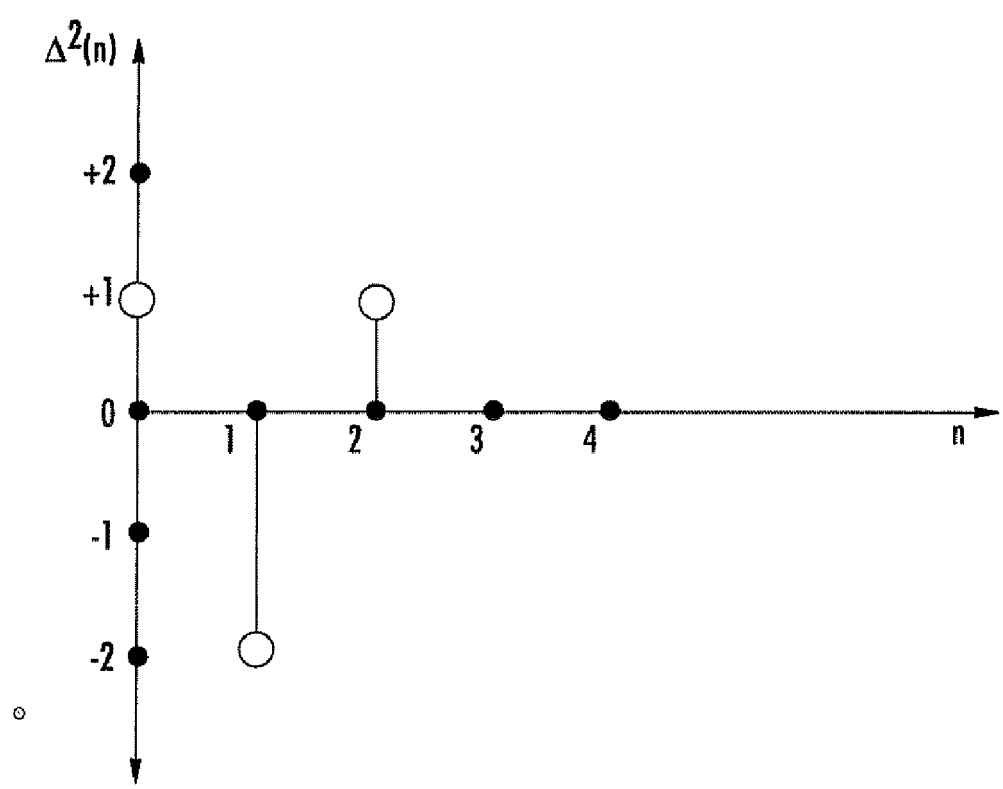
FIG. 8 illustrates the discrete-time Second Backward Difference Operator as a discrete time sequence.

This is illustrated in FIG. 8. The Discrete Fourier Transform is $$G(k) = 4\sin^2\left(\frac{\pi k}{N+M-1}\right) \quad (39)$$

The denominator in the argument of $G(k)$ is $N+M-1$, reflecting the total length of the sequence coming out of the deconvolving filter of FIG. 6, which is $$b(n)*f(n)$$

The operator $\Delta^2(n)$ is essentially a filter applied to the above convolution. So the roughness operator is to be convolved with that convolution, yielding:

$$\text{"roughness"}=\Delta^2(n)*(b(n)*f(n)) \quad (40)$$

The Constraint is applied by holding constant the quantity $$\gamma_2 \sum_{n=0}^{N+M-2} |\Delta^2(n) * (b(n) * f(n))|^2 \quad (41)$$

This quantity can be termed the integrated squared roughness or, simply, roughness, rather than Equation (39). The squared sum in Equation (41) is used because it can be handled analytically.

Using Parseval's theorem in the discrete domain, we can express Equation (41) in terms of the DFT's of the quantities. The result is $$\gamma_2 \sum_{k=0}^{N+M-2} |G(k) \cdot B(k) \cdot F(k)|^2 \quad (42)$$

to be minimized, along with Equation (18), by appropriate choice of $F(k)$. If we put Equation (42) together with Equation (18) the combined "error" can be written as Error (noiseless) = (43)

$$\sum_{k=0}^{N+M-2} \{|D(k) - B(k) \cdot F(k)|^2 + \gamma_2 |G(k) \cdot B(k) \cdot F(k)|^2\}$$

To minimize this error, we extract the gradient with respect to $F^*(k)$, and set the gradient equal to zero. This procedure had been shown to procedure the desired gradient. The result is that the minimum error (noiseless) is given $$F(k) = \frac{B*(k) \cdot D(k)}{|B(k)|^2 \cdot \left[1 + 16\gamma_2 \sin^4\left(\frac{\pi k}{N+M-1}\right)\right]} \quad (44)$$

When noise is an additional constraint, the final result we seek is given by Equation (21).

The Two-Dimensional Roughness Constraint is now considered. As shown above, the one-dimensional roughness is measured by the second backward difference operator. The two-dimensional counterpart of Equation (38) depends on whether the contributions of the two dimensions are separable. The case of separable roughness constraint case in two dimensions is treated first.

When the two-dimensionally roughness constraint is separable we denote the 2-D roughness by the second backward difference operator by:

$$\Delta^2(n,m) \quad (45)$$

In the case of separability, $$\Delta^2(n,m) = \Delta^2(n), \Delta^2(m) \quad (46)$$

Figure 9:
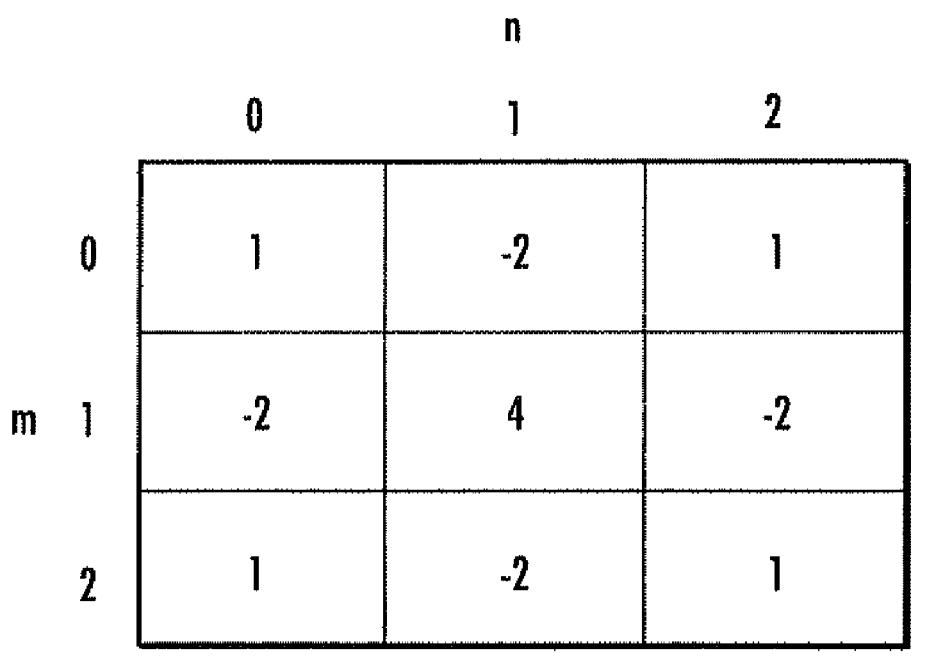
Figure 10:
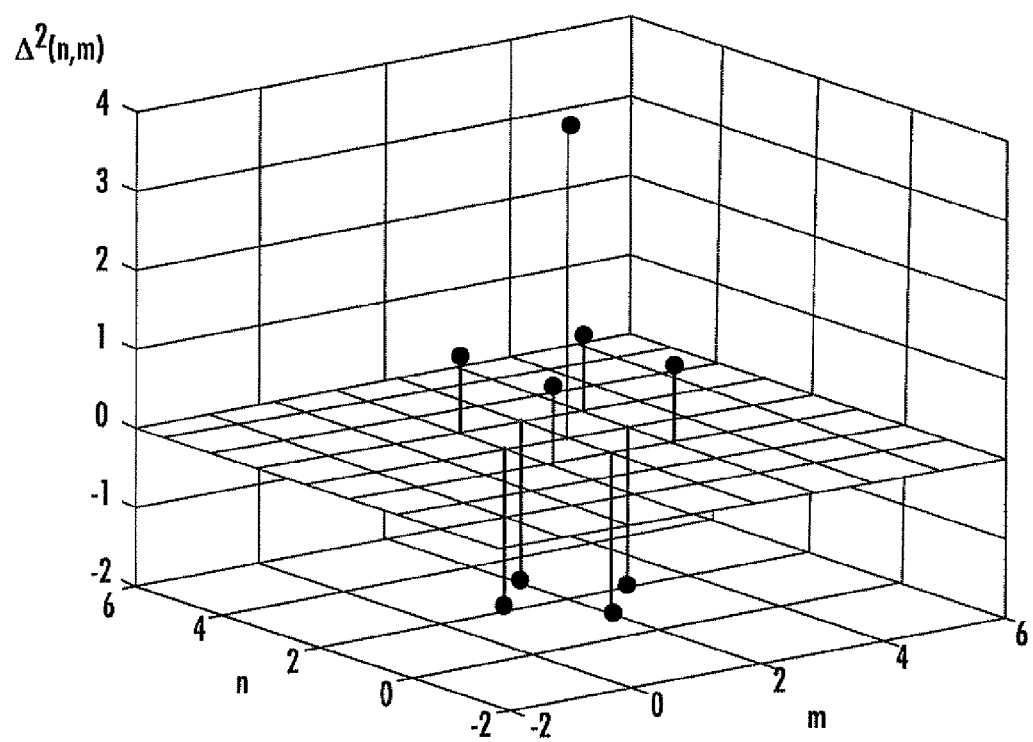
FIG. 10 illustrates the same information in graphical form.

In this case, we use Equation (38) to enable us to show the values in Equation (46) in the form of a matrix shown in FIG. 9 and in graphical form in FIG. 10. The Discrete Fourier Transform (in two dimensions $k_1$ and $k_2$) is $$G(k_1,k_2) = G_1(k_1) \cdot G_2(k_2)$$

where, $$G_1(k_1) = \sum_{n=0}^{2} \Delta^2(n) \exp\left(-\frac{j2\pi n k_1}{N+M-1}\right), k_1 = 0, 1, \ldots, N+M-1 \quad (47)$$

$$G_2(k_2) = \sum_{m=0}^{2} \Delta^2(n) \exp\left(-\frac{j2\pi n k_2}{Q+L-1}\right), k_2 = 0, 1, \ldots, Q+L-1 \quad (48)$$

It is useful to make $N+M=Q+L$ and so we let $$W = N+M-1 \quad (49)$$

Then, after a little algebra, it is found $$G(k_1, k_2) = G_1(k_1) \cdot G_2(k_2) = 16\sin^2\left(\frac{\pi k_1}{W}\right) \cdot \sin^2\left(\frac{\pi k_2}{W}\right) \quad (50)$$

We now consider the non-separable roughness constraint in two dimensions. Where the two-dimensional roughness constraint is not separable as in Equation (46), we have $$\Delta^2(n, m) = \begin{cases} +1, & m = n = 0 \\ -2, & m = n = 1 \\ +1, & m = n = 2 \\ 0, & \text{elsewhere} \end{cases} \quad (51)$$

Figure 11:
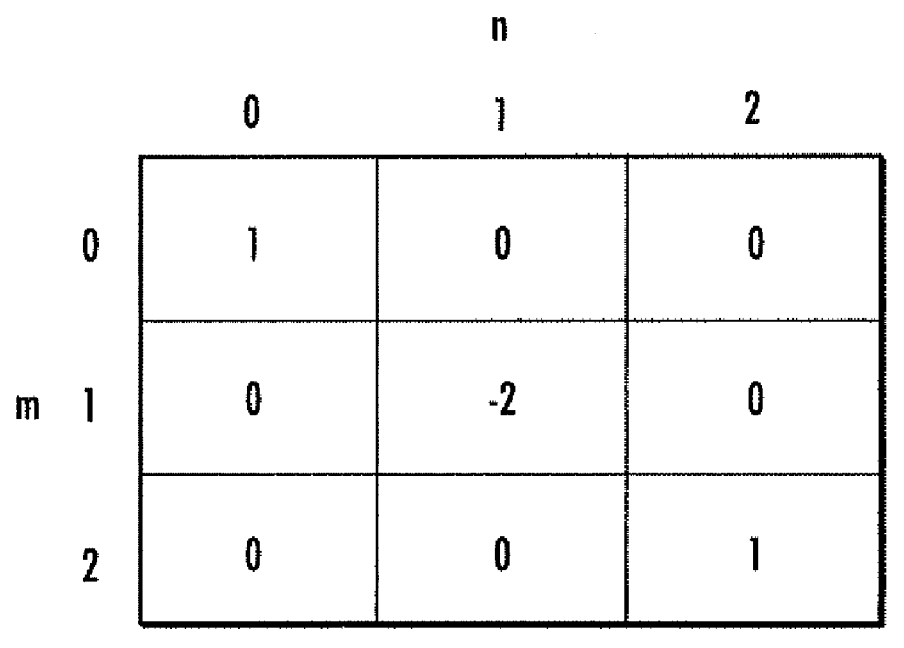
Figure 12:
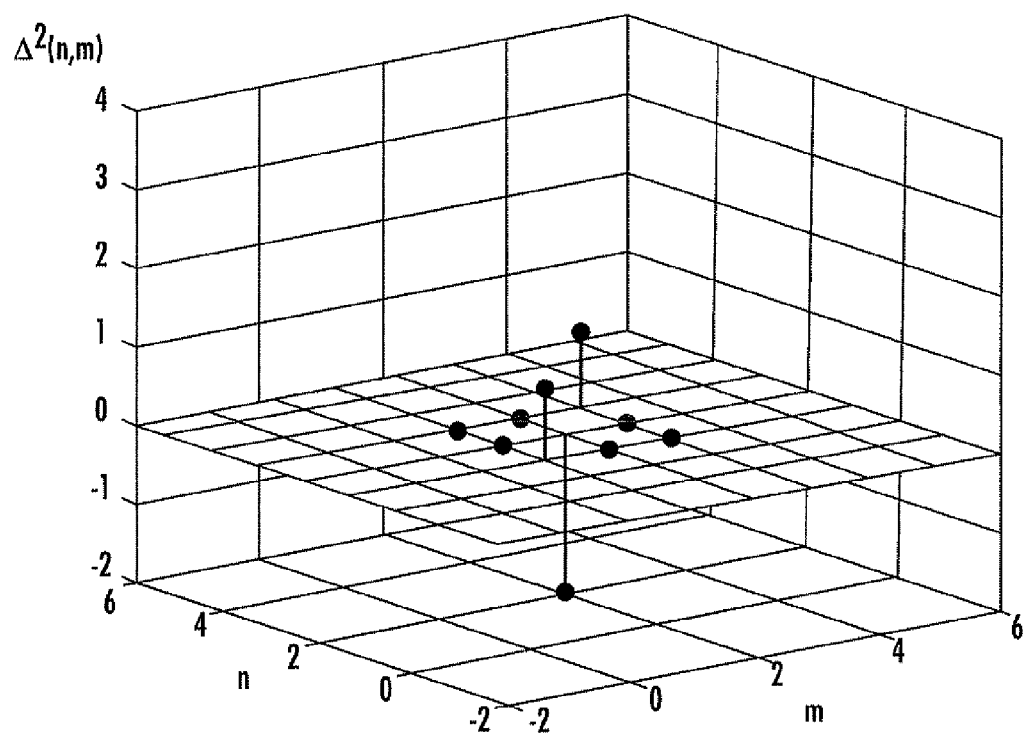

These values are shown in the matrix of FIG. 11 and, in graphical form, in FIG. 12. The DFT of this roughness constraint is worked out above. The result is $$G(k_1, k_2) = 4\sin^2\left[\frac{\pi(k_1 + k_2)}{W}\right] \quad (52)$$

The application of the roughness constraint is now considered. By analogy with Equation (41) we shall apply the two-dimensional roughness constraint by holding constant the quantity $$\gamma_4 \sum_{m=0}^{W-1} \sum_{n=0}^{W-1} |\Delta^2(n, m) * b(n, m) * f(n, m)|^2 \quad (53)$$

Using the two-dimensional Parseval theorem in discrete terms, Equation (53) can be expressed in terms of the DFTs of the quantities in Equation (53). The result is $$\gamma_4 \sum_{k_2=0}^{W-1} \sum_{k_1=0}^{W-1} |G(k_1, k_2) \cdot B(k_1, k_2) \cdot F(k_1, k_2)|^2 \quad (54)$$

to be minimized, along with Equation (29), by appropriate choice of F(k). So far, noise has been neglected. Noise will be inserted later. The combined "error" can be written as $$\text{Error (noiseless)} = \sum_{k_2=0}^{W-1} \sum_{k_1=0}^{W-1} \{|D(k_1, k_2) - B(k_1, k_2) \cdot F(k_1, k_2)|^2 + \gamma_4 |G(k_1, k_2) \cdot B(k_1, k_2) \cdot F(k_1, k_2)|^2\} \quad (55)$$

To minimize this as described above, we determine the gradient with respect to $F^*(k_1,k_2)$ and set this gradient to zero. This is carried out below in association with the finding of the minimum.

The procedure for finding the minimum is to express Equation (55) in terms of both $F(k_1,k_2)$ and its conjugate $F^*(k_1,k_2)$. Then the gradient with respect to $F^*$ is obtained. This is a straight forward procedure. The resulting gradient is set to zero and solved, yielding $$F(k_1, k_2) = \frac{D(k_1, k_2)}{|B(k_1, k_2)|^2 \cdot [1 + \gamma_4 |G(k_1, k_2)|^2]} \quad (56)$$

In Equation (56) $G(k_1,k_2)$ has two forms, given by Equation (50) for the separable form and Equation (52) for the non-separable form. Absorbing the constant into the coefficient $\gamma_4$, we have the following two results:

(a) For the separable roughness constraint, $$F(k_1, k_2) = \frac{D(k_1, k_2)}{B(k_1, k_2) \cdot (1 + \gamma_4 \sin^2(\pi k_1/W) \cdot \sin^2(\pi k_2/W))} \quad (57)$$

(b) For the non-separable constraint, $$F(k_1, k_2) = \frac{D(k_1, k_2)}{B(k_1, k_2) \cdot (1 + \gamma_4 \sin^2(\pi(k_1+k_2)/W))} \quad (58)$$

We now consider Z-Transforms. The bulk of this analysis deals with the deconvolution problem in terms of the Discrete Fourier Transform (DFT). It is also desirable to express our results in terms of z-transforms. There is, of course, a close relationship between the z-transform and the DFT. However, the use of the DFT implies that the sequences involved are of finite duration or are periodic. When division is performed, as in Equation (21) for the one dimensional case or in Equation (6) in the two-dimensional case, the result may be of longer duration than either the numerator or denominator. In fact, the quotient may have an infinite number of terms. This embarrassment can be alleviated somewhat by terminating the quotient to a desired number of terms. Such termination, however, will yield a remainder that represents an error in the deconvolution. It will, in general, be necessary by numerical means to determine a satisfactory termination. The necessity for termination is related to the choice of the length of the deconvolving filter f(n) or f(n,m), since that choice determines the accuracy of deconvolution. As we shall see below, even the z-transform approach requires that the length of the deconvolving filter be known. Thus, this length becomes a design parameter that must be determined.

The z-transform of the second backward difference operator in one dimension is considered first. From the definition of the z-transform, $$Z_\Delta(z) = \sum_{n=0}^{2} \Delta^2(n) z^{-n} \quad (59)$$

Using Equation (38), $$Z_\Delta(z) = 1 - 2z^{-1} + z^{-2} = \frac{z^2 - 2z + 1}{z^2} = \frac{(z-1)^2}{z^2} \quad (60)$$

The z-transform of the second backward difference operator in two dimension is now considered. The general expression is $$Z_\Delta(z_1, z_2) = \sum_{n=0}^{2} \sum_{m=0}^{2} \Delta^2(n, m) z_1^{-n} z_2^{-m} \quad (61)$$

For the separable case, we use the matrix of FIG. 9.

$$Z_\Delta(z_1, z_2) = \sum_{n=0}^{2} \Delta^2(n) z_1^{-n} \cdot \sum_{m=0}^{2} \Delta^2(m) z_2^{-m} \quad (62)$$

$$= \frac{(z_1^2 - 2z_1 + 1) \cdot (z_2^2 - 2z_2 + 1)}{z_1^2 z_2^2} \quad (63)$$

For the non-separable case, we use the matrix of FIG. 11.

$$Z_\Delta(z_1, z_2) = \sum_{m=0}^{2} \sum_{n=0}^{2} \Delta^2(n, m) z_1^{-n} z_2^{-m} \quad (64)$$

$$= \sum_{m=0}^{2} z_2^{-m} \cdot \sum_{n=0}^{2} \Delta^2(n, m) z_1^{-n}$$

$$= 1 - 2z_1^{-1} z_2^{-1} + z_1^2 z_2^2 = \frac{(z_1 z_2 - 1)^2}{z_1^2 z_2^2} \quad (65)$$

Figure 13:
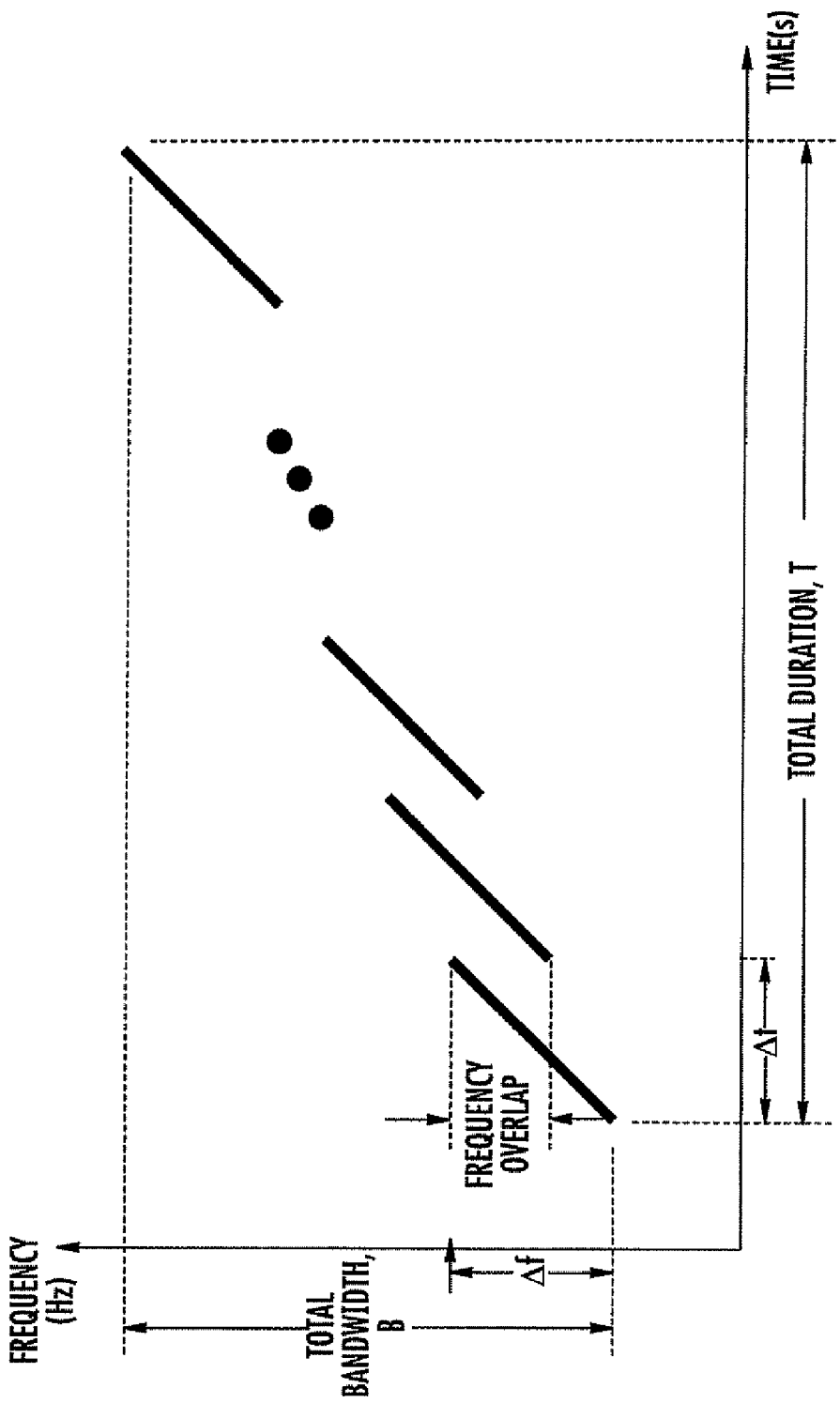
FIG. 13 is a plot representing a frequency-jump waveform, also known as the synthetic wideband waveform.

The point spread function in the 2-D example is now considered. The example selected here is that of a radar waveform often called a "frequency jump burst" (FJB) or "synthetic wideband (SWB)" waveform. It is a waveform of large duration and large bandwidth to get high energy together with fine range resolution and fine Doppler resolution. An example of such a waveform is illustrated in FIG. 13. The large bandwidth, B, is obtained in steps of smaller bandwidths Δf. The entire waveform yields a total bandwidth of B and a total time duration T. Such a waveform is often used in those cases where there is difficulty in creating a contiguous waveform of duration-bandwidth product BT. Such a waveform can produce a time (i.e. range) resolution corresponding to 1/B and Doppler frequency resolution corresponding to 1/T. The signal processing needed to achieve this combination is the combining of matched filtering (i.e. pulse compression) with pulse-to-pulse coherent integration. The segments in FIG. 13 show frequency overlap whose purpose is to reduce time and frequency sidelobes (known as grating lobes) that would occur in the receiver process.

The result of the matched filtering (pulse compression) and coherent integration of the reflection from an object of small dimensions (i.e. a "point" object) results in what is known as the "point function response" or "point spread function". For the waveform of FIG. 13, the point spread function is illustrated in FIG. 4. The point in question has no sensible extent in range and is motionless (zero-closing speed). Note that although the "point" is motionless, the point function response shows spread in both Doppler (closing speed) and in range. This is why it is often called the "point spread" function. In other words, what should be a response showing only a point (or area of small dimension) has been "spread" or "blurred", so that the exact combination of range and closing speed is blurred. The spread in range is directly related to the reciprocal of the bandwidth and the spread in closing speed is directly related to the waveform duration. The point spread function also shows "sidelobes" in range and speed. Such a phenomenon almost always occurs with matched filtering unless special provisions are made. An alternative view of the point spread function is shown in FIG. 14. This figure is an isometric view of the point spread function of FIG. 13. The sidelobe structure is clearly shown in FIG. 14. Also, the power scale or comparative intensity in dB should be considered for comparison purposes only.

Figure 16:
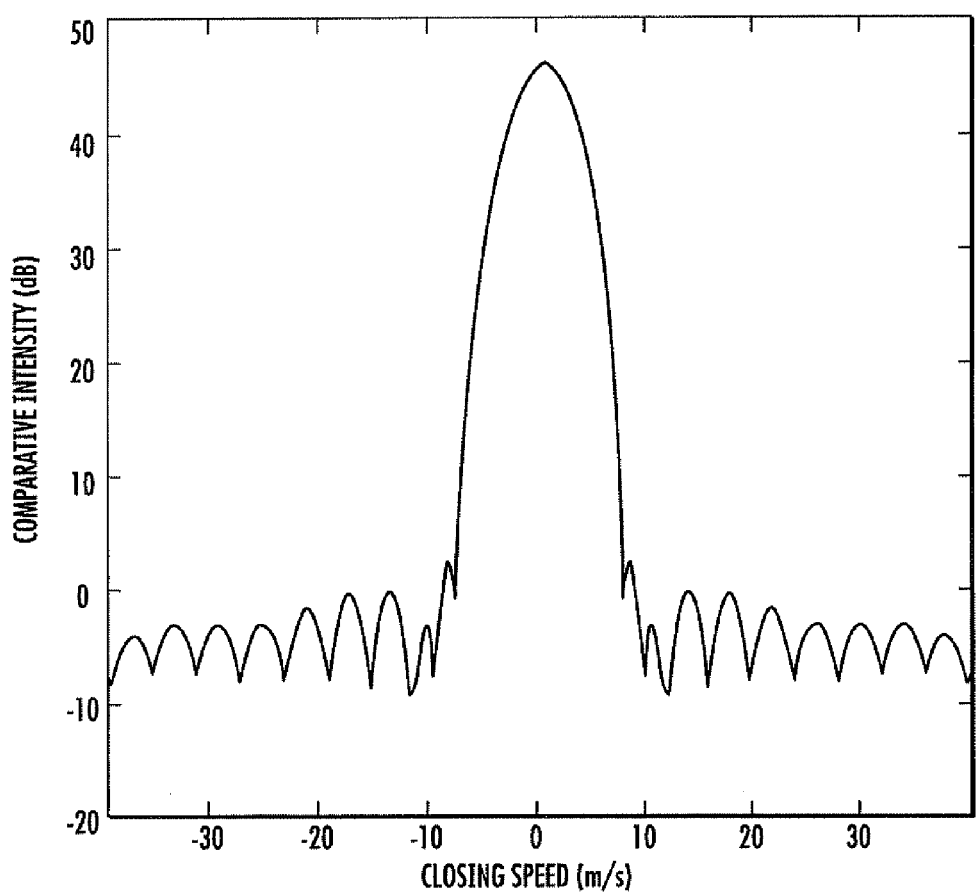
FIG. 16 is a Doppler cut through the point spread function of FIG. 4.

It is useful to get more quantitative information from the point spread function and the quantities corresponding to range and Doppler resolution. Such information can be obtained from FIGS. 15 and 16. FIG. 15 shows a range cut though FIG. 13 or FIG. 4 at zero Doppler shift. FIG. 16 shows a Doppler cut through FIG. 13 or FIG. 4 at zero range. FIGS. 4 and 14-16 correspond to the input sequence b(n,q) of FIG. 2. FIGS. 4 and 14-16 show considerable spread (i.e. blurring) in the range and Doppler dimensions. Our purpose now is to show that applying the coherent deblurring implied by FIG. 2 and equation (6) or (7) can significantly sharpen the image.

First of all, in Equation (6) the noise constraint $\gamma_3$ was not used. Only the roughness constraint with $$\gamma_4 = 1 \times 10^{-9} \tag{66}$$

was used. With an appropriate value for $\gamma_4$, one may say that a noise constraint also has been applied, but a noise constraint was not explicitly applied. The result of also applying a noise constraint will be considered in a future technical analysis.

Figure 17:
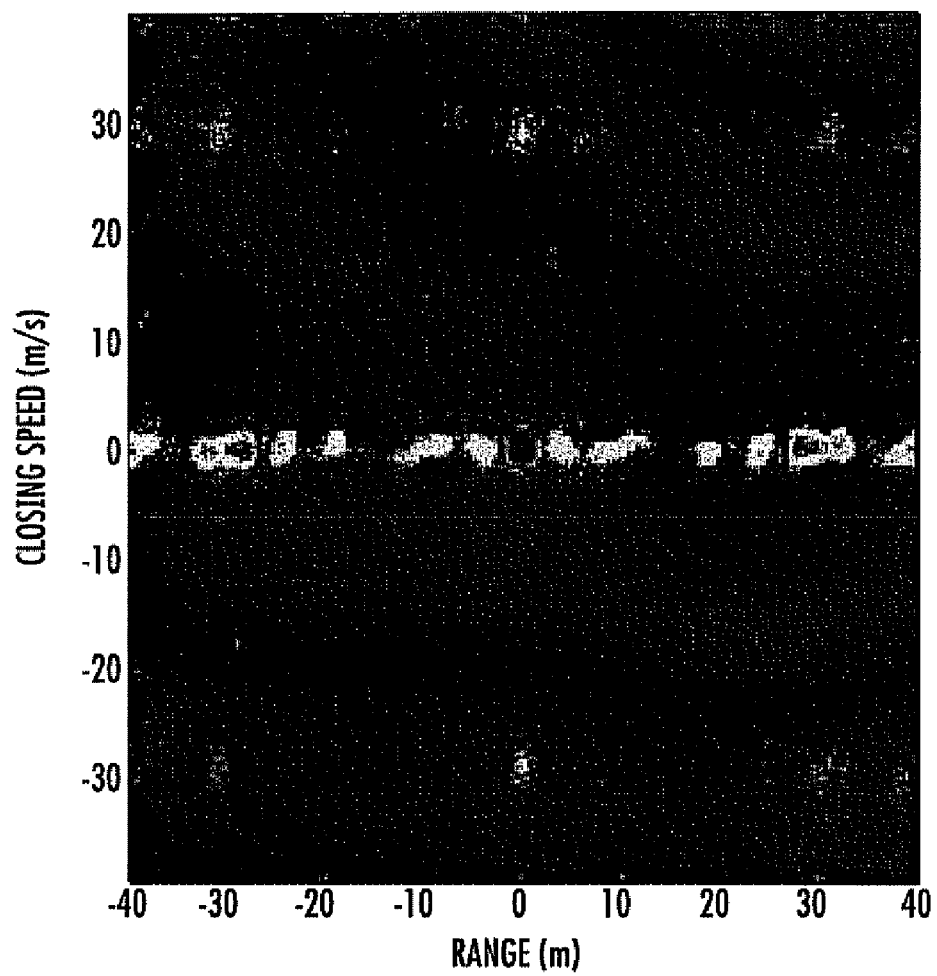
FIG. 17 is a plan view of the coherent deblurring, showing a small extent at (0,0)
Figure 18:
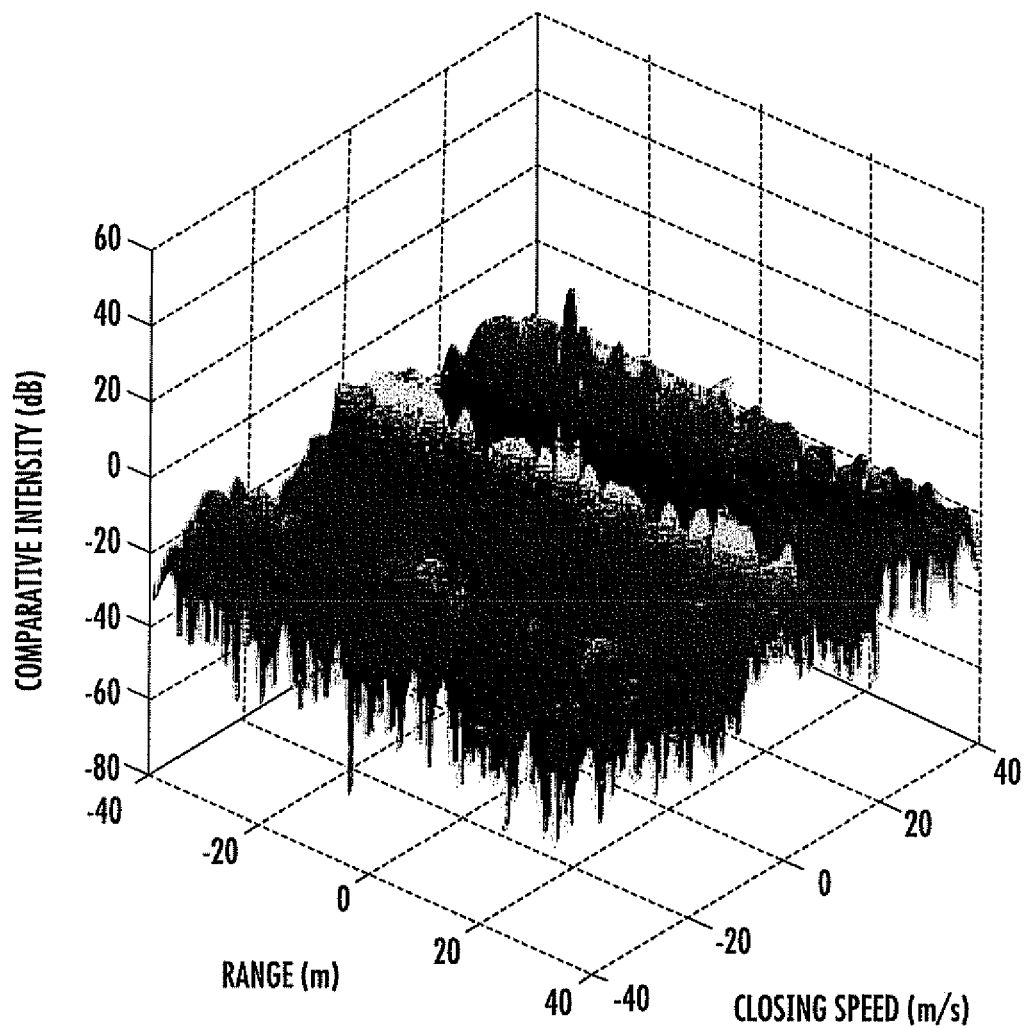
FIG. 18 is an isometric view of the deconvolved or deblurred image of FIG. 14.
Figure 19:
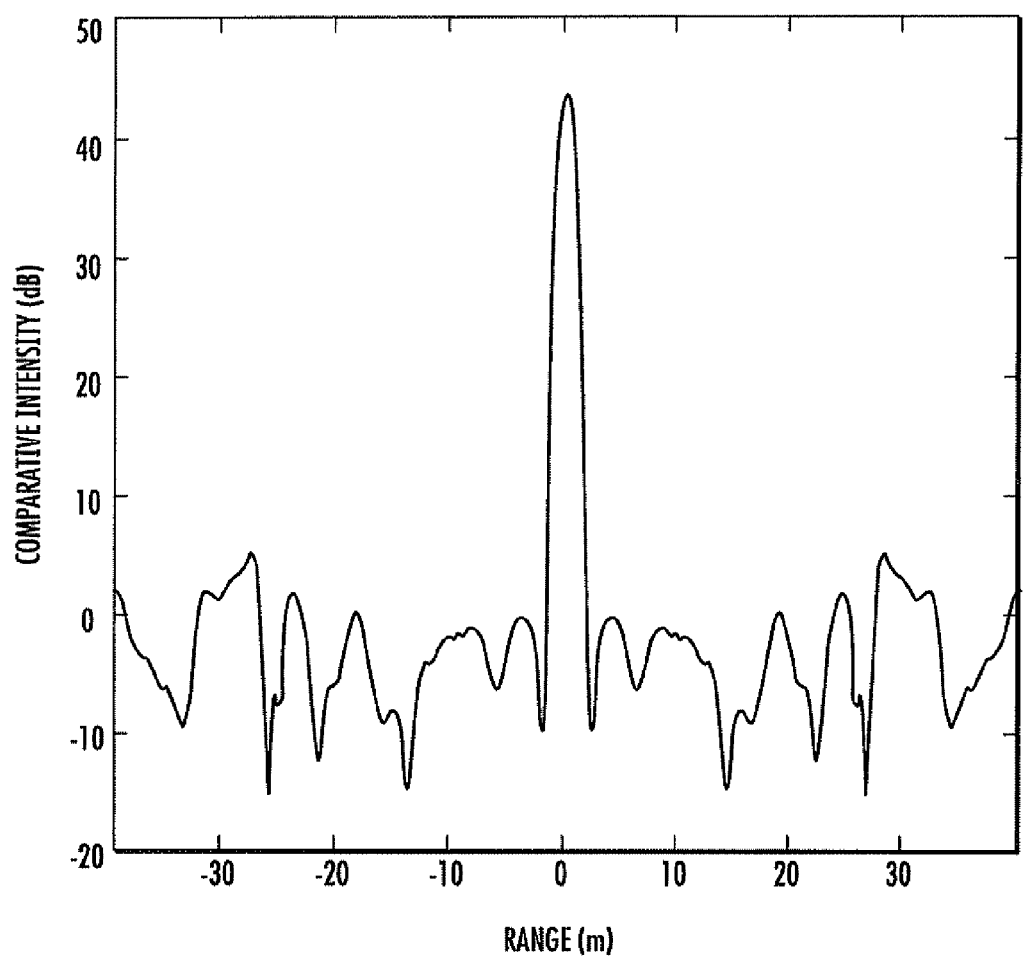
FIG. 19 is a range projection of the deblurred image of FIG. 18.
Figure 20:
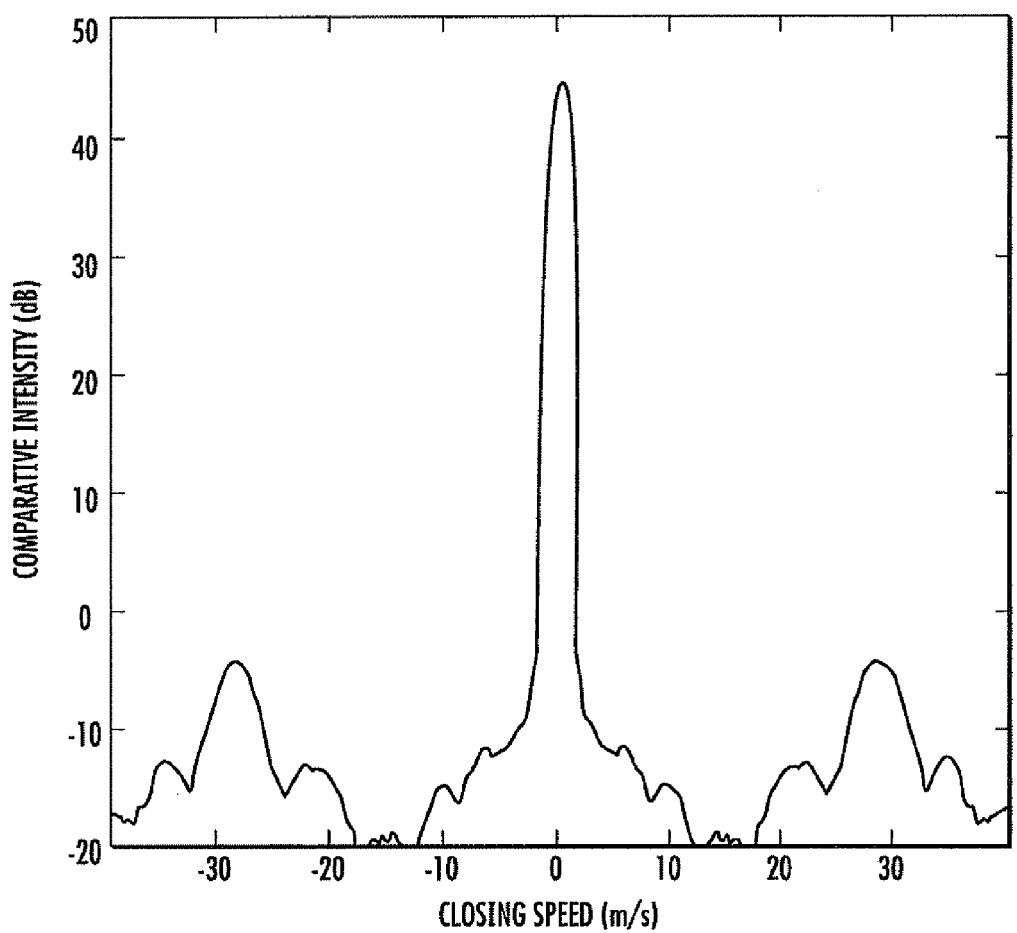
FIG. 20 is a Doppler projection of the deblurred image of FIG. 18.

The results are shown in FIGS. 17, 18, and 19. FIG. 17 is a "plan" view of the coherent deblurring. Note that the "spread" of the point response function is greatly reduced in both dimensions relative to the blurred results in FIGS. 14, 15, and 16. A better view of the deblurred image is shown in the isometric view of FIG. 18. A comparison of the improvement in the range and Doppler may be obtained from FIGS. 19 and 20 and comparing them with their counterparts, FIGS. 15 and 16. The range projection in FIG. 19 shows an improvement in range resolution (i.e., reduction in resolvable range) of approximately five to one when compared with the range projection in FIG. 15. A considerable comparable improvement is shown in FIG. 20 when compared with FIG. 16 for the Doppler dimension, measured in meters per second.

Thus, a method according to an aspect of the invention is for displaying (32) at least one of range and Doppler of a moving remote target (20). The method comprises the step of generating return electromagnetic signals (18r) from at least one moving target (20). From the return electromagnetic signals, a two-dimensional radar image (FIG. 4) is generated by matched linear filtering (28). The matched linear filtering (28) is based upon the maximization of the peak amplitude of the combined set of pixels of the two-dimensional image. The matched linear filtering undesirably spreads the resulting pixels of the image in both dimensions to produce a point spread function. Coherent deblurring of the image, including its point spread function, is performed, to produce a deblurred image. The coherent deblurring is performed by filtering with coefficients derived from a least-squares criterion, so that phase information of the return signal is preserved during the coherent deblurring. At least the target range or target Doppler or closing rate is displayed or otherwise used. In a specific mode of the method, the least-squares criterion minimizes the difference in both dimensions between the two-dimensional image and a desired two-dimensional image. In another mode, the coherent deblurring is performed through a formula using a squared norm of an error sequence, most desirably an integrated squared residual. In a preferred mode of the method, the step of generating return electromagnetic signals includes the step of transmitting dispersed radar signals. One type of dispersed radar signals includes a frequency-jump waveform.

A method according to another aspect of the invention is for displaying information relating to a target. This method comprises the steps of transmitting radar signals toward the target, and receiving reflected radar signals from the target. The reflected radar signals are processed using a pulse-compression filter to produce a first two-dimensional radar image. A noise limit is established for the signals of the image, and a maximum irregularity is also established. A desired deconvolved image is established. The reflected radar signals and the desired deconvolved image are processed through a least-squares fit to provide a deblurred output image in which the noise does not exceed the noise limit and the shape does not exceed the maximum irregularity. At least one of the range and Doppler portions of the deblurred image is displayed or otherwise used.

What is claimed is:

1. A method for displaying at least one of range and Doppler of a moving remote target, said method comprising the steps of:
   generating return radar signals from at least one moving target;
   from said return radar signals, generating a two-dimensional image by matched linear filtering, which matched linear filtering is based upon maximization of the peak amplitude of combined set of pixels of the two-dimensional image, which undesirably spreads the resulting pixels of the image in both dimensions to produce a point spread function;
   performing a coherent deblurring of the image including its point spread function to produce a deblurred image, by filtering with coefficients derived from a least-squares criterion wherein phase information of the signals is preserved during the coherent deblurring; and
   displaying at least one of range and Doppler information from said deblurred image.

2. A method according to claim 1, wherein said least squares criterion minimizes the difference in both dimensions between the two-dimensional image and a desired two-dimensional image.

3. A method according to claim 1, wherein the coherent deblurring is performed through a filtering operation, the coefficients of which are derived from a mathematical least squares criterion.

4. A method according to claim 1, wherein the coherent deblurring is performed through a formula using a squared norm of an error sequence.

5. A method according to claim 4, wherein the squared norm of the error sequence is an integrated squared residual.

6. A method according to claim 1, wherein the matched linear filtering performs a convolution of the signal of the image.

7. A method according to claim 1, wherein the matched linear filtering results in a pulse compression of the signal.

8. A method according to claim 1, wherein the return radar signals are from a point target.

9. A method according to claim 1, wherein said return radar signals are dispersed.

10. A method according to claim 9, wherein said dispersed radar signals are in the form of a frequency-jump burst.

11. A method according to claim 1, including, following said step of generating a two-dimensional image by matched linear filtering, the step of designating an output shape.

12. A method according to claim 11, wherein said designated output shape is Gaussian.

13. A method for displaying information relating to a target, said method comprising the steps of:
    transmitting radar signals toward said target;
    receiving reflected radar signals from said target;

processing said reflected radar signals using a pulse-compression filter to produce a first two-dimensional radar image;

establishing a noise limit for the signals of said image;

establishing a maximum irregularity for deconvolved signals of said image;

establishing a desired deconvolved image;

processing the reflected radar signals and the desired deconvolved image through a least squares fit to provide a deblurred output image in which noise does not exceed the noise limit and the shape does not exceed the maximum irregularity; and displaying or otherwise using the deblurred output image.

14. A method according to claim 13, wherein said step of processing said reflected radar signals using a pulse-compression filter includes the step of processing said reflected radar signals using a pulse-compression filter matched to the transmitted radar signals.

15. A method according to claim 14, wherein said step of processing said reflected radar signals using a pulse-compression filter matched to the transmitted radar signals includes the step of compressing the reflected radar signals to a duration equal to the reciprocal of the pulse bandwidth.

16. A method for displaying information relating to a remote target, said method comprising the steps of:

transmitting radar signals toward the target, to thereby generate return signals;

applying the return signals to a compression filter, to thereby generate compressed return signals;

generating I and Q signals from the compressed return signals to thereby generate an image with dimensions of range and Doppler, which image is subject to blurring attributable to the compression filter;

imposing constraints on noise of a desired deblurred image;

imposing constraints on roughness of the desired deblurred image;

generating a transform of the desired deblurred image;

taking a DFT of the transform of the desired deblurred image, to thereby generate the desired deblurred image; and displaying or otherwise using information relating to the deblurred image.

17. A method according to claim 16, wherein said step of imposing constraints on the noise includes the step of computing $$F(k_1, k_2) = \frac{B^*(k_1, k_2) \cdot D(k_1, k_2)}{|B(k_1, k_2)|^2 + \gamma_3}$$

where:

B is the two-dimensional DFT of the blurred two-dimensional image;

D is the two-dimensional DFT of the desired deblurred image;

F is the two-dimensional DFT of the deblurring filtering; and $\gamma_3$ acts as a constraint on the imperfections attributable to noise.

18. A method according to claim 16, wherein said step of generating the transform of the desired deblurred image comprises the step of calculating the inverse DFT of the product B(k1, k2) F(k1,k2).

19. A method for deblurring a radar image of a target, the method comprising:

matched filtering radar signals returned from the target to generate a two-dimensional image of the target; and coherent deblurring the two-dimensional image to produce a deblurred image, by filtering with coefficients derived from a least-squares criterion wherein phase information of the signals is preserved during the coherent deblurring.

20. The method according to claim 19, further comprising displaying information from the deblurred image.

21. The method according to claim 19, wherein the matched linear filtering spreads pixels of the image in both dimensions to produce a point spread function and wherein the deblurring is performed on the image's point spread function.

22. A system for deblurring a radar image of a target, the system comprising:

a matched filter for generating a two-dimensional image of the target from radar signals returned from the target; and a deblurring filter for performing a coherent deblurring of the two-dimensional image to produce a deblurred image, by filtering with coefficients derived from a least-squares criterion wherein phase information of the signals is preserved during the coherent deblurring.

23. The system according to claim 22, further comprising a display for displaying information from the deblurred image.

24. The system according to claim 22, wherein the matched linear filter spreads pixels of the image in both dimensions to produce a point spread function and wherein the deblurring filter performs the deblurring on the image's point spread function.

* * * * *